US012612256B2

(12) United States Patent
Yang et al.

(10) Patent No.: US 12,612,256 B2
(45) Date of Patent: Apr. 28, 2026

(54) LOW ROLLING RESISTANCE CONVEYOR BELT

(71) Applicant: ContiTech Deutschland GmbH, Hannover (DE)

(72) Inventors: Heng-Huey Yang, Bedford, TX (US); Thomas George Burrowes, North Canton, OH (US)

(73) Assignee: ContiTech Deutschland GmbH, Hannover (DE)

( * ) Notice: Subject to any disclaimer, the term of this patent is extended or adjusted under 35 U.S.C. 154(b) by 35 days.

(21) Appl. No.: 18/586,151

(22) Filed: Feb. 23, 2024

(65) Prior Publication Data

US 2025/0270047 A1      Aug. 28, 2025

(51) Int. Cl.
*B65G 15/36* (2006.01)
*B65G 15/34* (2006.01)

(52) U.S. Cl.
CPC ............. *B65G 15/36* (2013.01); *B65G 15/34* (2013.01); *B65G 2812/02198* (2013.01); *B65G 2812/02217* (2013.01)

(58) Field of Classification Search
CPC ................................ B65G 15/34; B65G 15/36
USPC ......................................................... 198/847
See application file for complete search history.

(56) References Cited

U.S. PATENT DOCUMENTS

| 7,910,207 B2 | 3/2011 | Kamiyama |
| 10,766,703 B2 | 9/2020 | Yang |

| 2014/0021021 A1* | 1/2014 | Pero ........................ B65G 15/34 |
| | | 156/333 |
| 2015/0034458 A1* | 2/2015 | Burrowes .............. B65G 15/36 |
| | | 198/847 |
| 2019/0225424 A1* | 7/2019 | Yang ........................ B32B 3/08 |
| 2023/0099380 A1 | 3/2023 | Gerring |
| 2024/0026126 A1 | 1/2024 | Krupp |

FOREIGN PATENT DOCUMENTS

| CA | 2878816 C | * 11/2020 | ............. B65G 15/34 |
| CN | 108357857 A | * 8/2018 | ............. B65G 15/36 |
| CN | 111924419 B | * 3/2022 | ............. B65G 15/34 |
| JP | 2016210519 A | 12/2016 | |

OTHER PUBLICATIONS

Teijin Frontier USA, Inc., Nanofront™ Ultra Fine Chopped Polyester Fiber for Rubber Mixing, retrieved online Feb. 20, 2024: https://www.teijin-frontier-usa.com/wp-content/uploads/ULTRA_FINER_POLYESTER_CHOPPED_FIBER.pdf.
EP Examination Report dated Jul. 7, 2025 of counterpart European Application No. 25154583.6.

* cited by examiner

*Primary Examiner* — James R Bidwell
(74) *Attorney, Agent, or Firm* — Lippes Mathias LLP

(57) ABSTRACT

An article such as a conveyor belt includes an elastomeric composition containing high-aspect ratio nanofibers having a diameter in a range from 10 nm to 1,000 nm, and an aspect ratio in a range from 500 to 15,000. The nanofibers may enable a reduction in the total amount of all reinforcing agent(s) in the composition while providing suitable mechanical properties, which, in turn, reduces average rolling resistance of the elastomeric composition. This makes the elastomeric composition particularly suitable for a bottom cover layer of a conveyor belt.

19 Claims, 9 Drawing Sheets

LOW ROLLING RESISTANCE CONVEYOR BELT

TECHNICAL FIELD

The present disclosure relates generally to an elastomeric article having low rolling resistance, and more particularly to a low rolling resistance conveyor belt.

BACKGROUND

Heavy-duty conveyor belts are commonly used for transporting products and material. The conveyor belts so employed may be long, for example, on the order of miles, and represent a high-cost component of an industrial material handling operation. Such conveyor belts can be as large as ten feet wide, and possibly as thick as three inches. Typically, such conveyor belts include a top or carry cover layer, a bottom or pulley cover layer, and a reinforcement layer between the top and bottom cover layers. The top and bottom cover layers are typically formed from an elastomeric material. The reinforcement layer may include reinforcing steel cords that are embedded in an elastomeric matrix to form a carcass of the belt. Alternatively, the reinforcing layer may include one or more plies of a textile material.

SUMMARY

Long conveyor systems require vast amounts of energy to run and have a direct impact on the operating costs of the material handling operation. A substantial portion of the energy losses from the conveyor belt system is attributable to the viscoelastic hysteresis of the elastomeric material utilized in manufacturing the conveyor belt. As a section of the conveyor belt passes over a roller that supports the conveyor belt along its path of travel, that section of the conveyor belt locally deforms to generally match the shape of the roller. Once that section of the conveyor belt travels past the roller, the deformation recovers. A significant amount of mechanical energy is consumed by viscoelastic hysteresis and transformed into heat buildup through the repetition of this cycle at each roller.

One way to reduce the viscoelastic hysteresis is to manufacture the conveyor belt with elastomeric compounds that exhibit less hysteresis and accordingly have a lower level of rolling resistance. For example, prior attempts have focused on increasing the filler-to-polymer interaction of the composition and/or reducing the filler network of the composition to improve rolling resistance. Such prior attempts, however, encountered challenges as the composition exhibited inadequate tensile strength and/or abrasion resistance. As such, there is an ongoing need to develop elastomeric compounds with low rolling resistance and with sufficient mechanical properties so as to provide a suitable conveyor belt that improves the energy efficiency of the conveying system.

At least one aspect of the present disclosure solves one or more problems associated with conventional conveyor belts by providing an elastomeric composition that improves rolling resistance over a relevant temperature range while attaining suitable properties such as tensile strength and/or abrasion resistance.

According to at least one aspect, a conveyor belt includes: a top cover layer, a bottom cover layer, and a reinforcement layer between the top and bottom cover layers, wherein at least the bottom cover layer is formed from an elastomeric composition containing high-aspect ratio nanofibers having a diameter in a range from 10 nm to 1,000 nm, and an aspect ratio in a range from 500 to 15,000.

Such high aspect ratio nanofibers serve as a highly effective reinforcing agent in the composition, and thus may enable the reduction of the total amount of all reinforcing agent(s) in the composition while providing suitable mechanical properties, such as tensile strength and/or abrasion resistance. This lower total loading of reinforcing agent(s), in turn, also increases the elastomer-to-elastomer contact in the composition, thereby improving the rolling resistance.

According to an aspect, the total amount of the high aspect ratio nanofibers present in the composition may be relatively low while permitting the reduction in overall reinforcement content while attaining the desired properties.

For example, the total amount of the high aspect ratio nanofiber present in the composition may be in a range from about 1 phr to about 10 phr; more particularly from about 1 phr to about 5 phr; even more particularly from about 1 phr to about 3 phr.

Such loading of the high aspect ratio nanofibers has been found to enable a reduction in overall reinforcing agent content. For example, when compared against a control composition having the same basic composition but without the high aspect ratio nanofibers and with a greater total reinforcement agent loading, the exemplary elastomeric composition has been found to provide suitable mechanical properties with at least 15% less total reinforcing agent content.

In addition, when compared against a control composition having the same basic composition but without the high aspect ratio nanofibers and with a greater total reinforcement agent loading, an exemplary elastomeric composition with high aspect ratio nanofibers has been found to have a lower average rolling resistance factor over a temperature range from −20° C. to +20° C. More particularly, the exemplary elastomeric composition with nanofibers may reduce average rolling resistance factor by up to about 20% over the temperature range as compared to the control composition.

Using such high aspect ratio nanofibers also has been found to improve the rolling resistance factor of the elastomeric composition over a much broader temperature range (e.g., −40° C. to +40° C.) as compared to more conventional ranges (e.g., −20° C. to +20° C.).

In addition, the relatively low loading of the high aspect ratio nanofiber and reduced overall reinforcing agent content has been found to have little to no reduction in mechanical properties such as tensile, modulus at 25%, and/or abrasion resistance, as compared against control composition without nanofiber and higher reinforcement agent loading. For example, it has been found that an exemplary elastomeric composition with high aspect ratio nanofibers may have a modest reduction in such propert(ies) of at most 10% as compared to the control composition, and in many cases improves one or more of these mechanical properties, such as modulus at 25%, hardness, and dynamic storage shear modulus.

The relatively low loading of the high aspect ratio nanofiber also has been found to reduce the anisotropic effect on the mechanical propert(ies) of the elastomeric composition. For example, an exemplary elastomeric composition with high aspect ratio nanofibers has been found to exhibit a ratio of modulus at 25% for with fiber direction (along the length of the nanofibers, or in the processing direction) relative to against fiber direction (perpendicular to the length of the nanofibers, or perpendicular to the processing direction) that is in a range from about 1.0 to about 2.0, more particularly from about 1.0 to about 1.5, which is relatively isotropic behavior for a fiber-reinforced composition.

Interestingly, the present inventors surprisingly found that increasing the quantity of high aspect ratio nanofibers in the composition beyond a certain amount caused a reduction in mechanical properties. Accordingly, the present inventors found that there may be a relatively low and relatively narrow optimal range for incorporating the high aspect ratio nanofibers to improve rolling resistance while attaining desired mechanical properties, whereas beyond this range mechanical properties may deteriorate. In accordance with exemplary embodiment(s), this range is believed to be 10 phr or less nanofibers in the composition. More specifically, in certain embodiments, the inventors found improved results in a range from about 1 phr to about 5 phr high aspect ratio nanofiber in the elastomeric composition, even more particularly from about 1 phr to about 3 phr.

Generally, the high aspect ratio nanofiber may take any suitable form and may be made of any suitable material. In exemplary embodiment(s), however, it has been found that a conjugated nanofiber having a sea-island fiber morphology enables improved dispersion and compatibility in the elastomeric composition. In such a sea-island structure, the high aspect ratio nanofibers (e.g., PET-material) form islands within a sea of polymeric material (e.g., PE-material) which can improve dispersion and material performance.

The following description and the annexed drawings set forth certain illustrative embodiments according to the present disclosure. These embodiments are indicative, however, of but a few of the various ways in which the principles of the invention may be employed. Other objects, advantages and novel features according to aspects of the present disclosure will become apparent from the following detailed description when considered in conjunction with the drawings.

BRIEF DESCRIPTION OF THE DRAWINGS

The annexed drawings, which are not necessarily to scale, show various embodiments according to the present disclosure.

4

Figure 14:
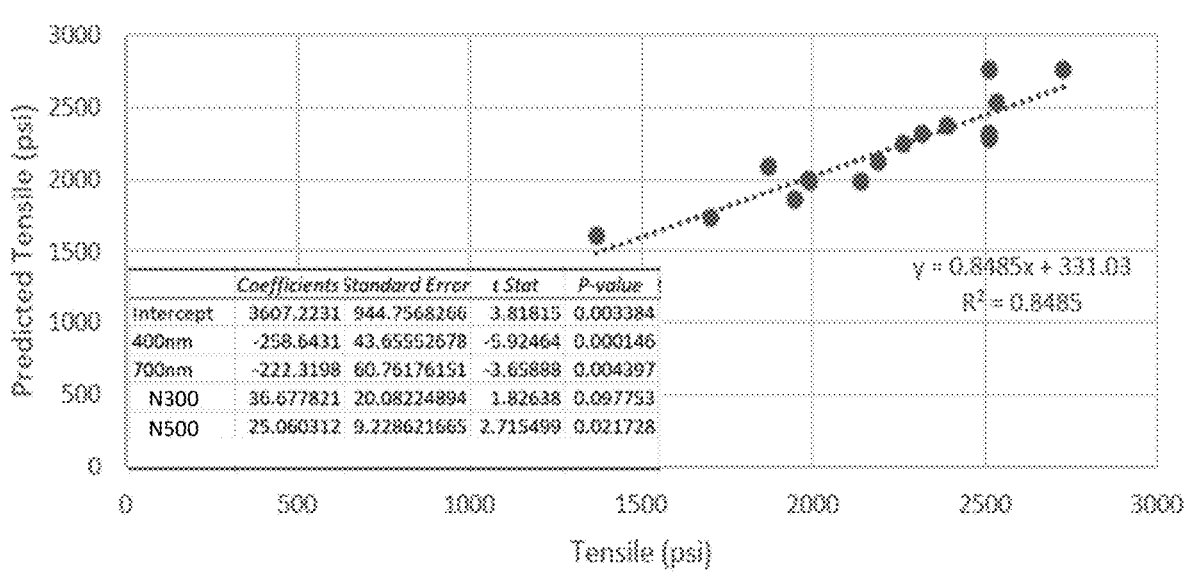

FIG. 14 shows tensile regression data according to examples.

Figure 15:
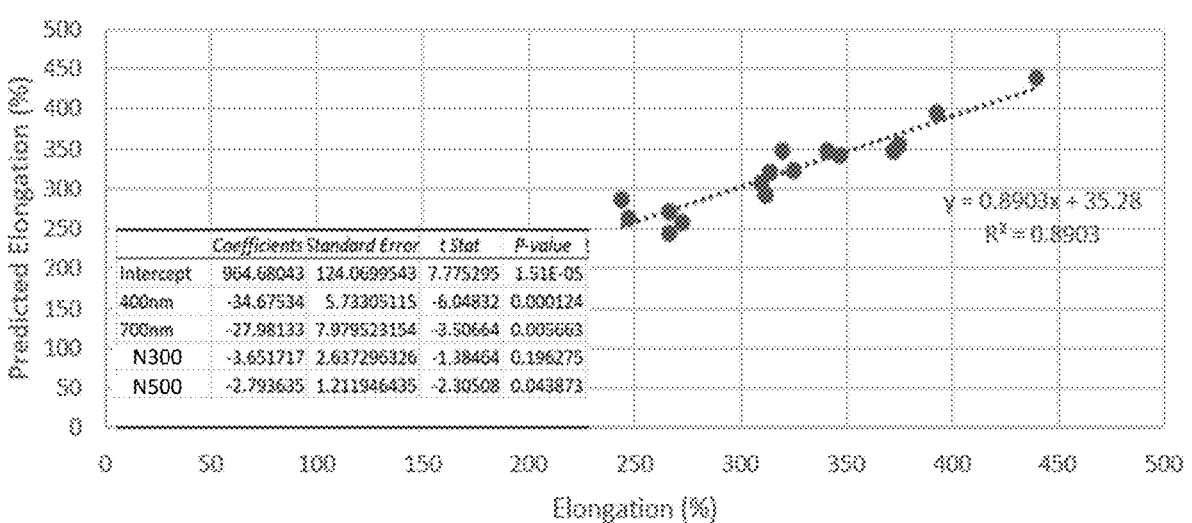

FIG. 15 shows elongation regression data according to examples.

Figure 16:
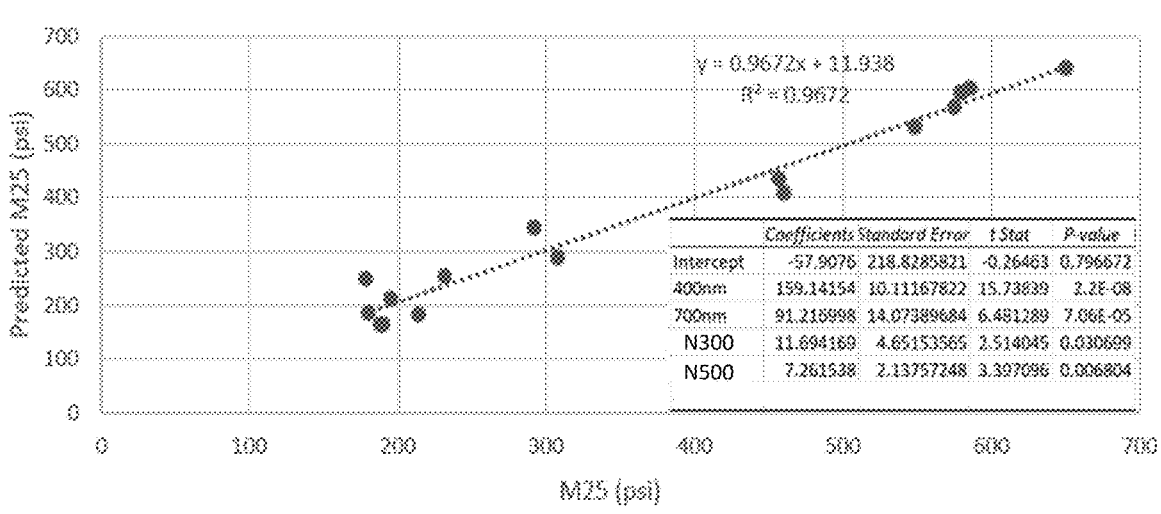

FIG. 16 shows Mod25 regression data according to examples.

Figure 17:
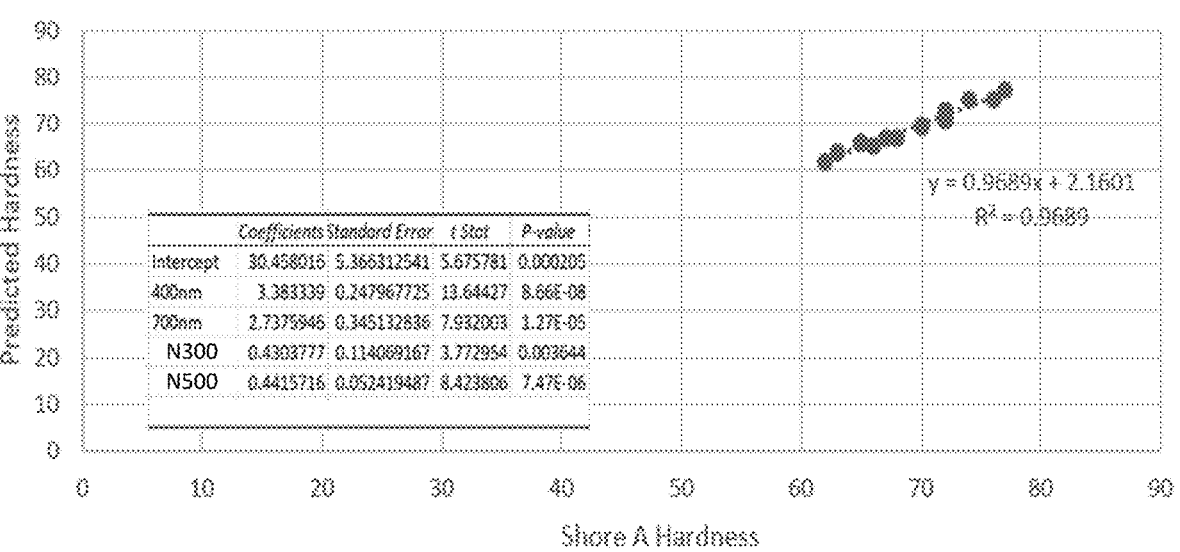

FIG. 17 shows Shore A hardness regression data according to examples.

DETAILED DESCRIPTION

The principles and aspects according to the present disclosure have particular application to conveyor belts, such as for heavy-duty operations, and thus will be described herein mainly in this context. It is understood, however, that the principles and aspects of the present disclosure may be applicable to other types of belts for other applications, or to other elastomeric articles in general, when desirable to provide one or more advantages of the material(s) and/or construction(s) described herein.

Aspect(s) according to the present disclosure provide a unique elastomeric composition and/or a unique article construction using such an elastomeric composition, in which the elastomeric composition includes high aspect ratio nanofibers in an amount that improves rolling resistance and/or provides desirable mechanical properties, such as tensile, modulus, hardness, dynamic storage shear modulus and/or abrasion resistance.

Generally, the elastomeric composition having the high aspect ratio nanofibers may be used in a reinforced elastomeric article having an elastomeric body and at least one reinforcement layer attached to or within the elastomeric body. In exemplary embodiments, the unique elastomeric composition with high aspect ratio nanofibers may have one or more material properties making it particularly suitable for use in an article such as a conveyor belt.

Article Embodiment(s)

Certain article embodiments of the disclosure will hereafter be described with reference to the accompanying drawings, in which like reference numerals denote like elements. It should be understood, however, that the accompanying figures illustrate the various implementations described herein and are not meant to limit the scope of various technologies described herein. In addition, it is understood that various aspects and features of these embodiments may be substituted for one another or used in conjunction with one another where applicable. Furthermore, it is understood that the description of material(s) forming the various parts of one embodiment article may be the same material(s) for the same or similar part in another embodiment article, except as otherwise noted below.

Figure 1:
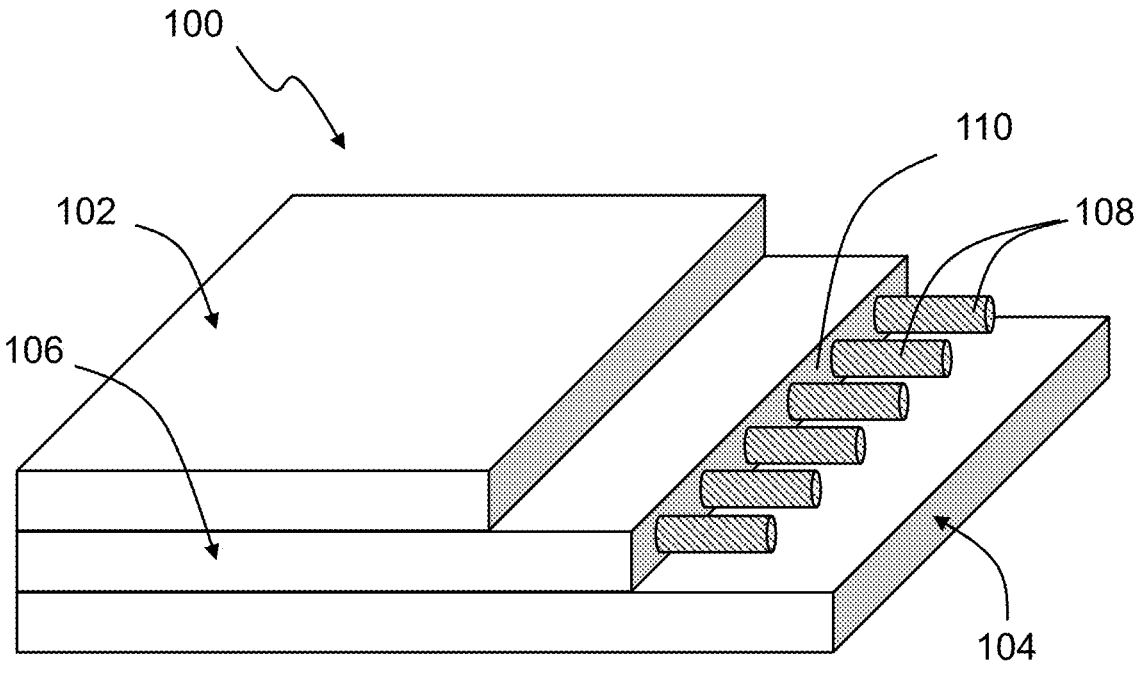
FIG. 1 illustrates a portion of a conveyor belt in a perspective sectional view, in accordance with an embodiment of the present disclosure.

Referring to FIG. 1, a portion of an exemplary conveyor belt 100 is shown in perspective sectional view. The conveyor belt 100 includes a top or carry cover layer 102, a bottom or pulley cover layer 104, and a reinforcement layer 106 between the top cover layer 102 and the bottom cover layer 104. The top cover layer 102 is configured to carry the material being conveyed, and may include a coating layer such as a fabric or abrasion resistant coating that restricts wear. The bottom cover layer 104 is configured to pass over rollers or pulleys in the conveyor system which support the belt 100, and thus at least the bottom cover layer 104 may locally deform to generally match the shape of the roller as it passes thereover. The reinforcement layer 106 may include reinforcing cords 108 that are embedded in an elastomeric body 110 to form a carcass of the belt 100. The reinforcing cords 108 may be made of any suitable material (e.g., steel), may have any suitable thickness, and may be provided in any suitable number to provide a major load carrying capability of the belt 100.

Figure 2:
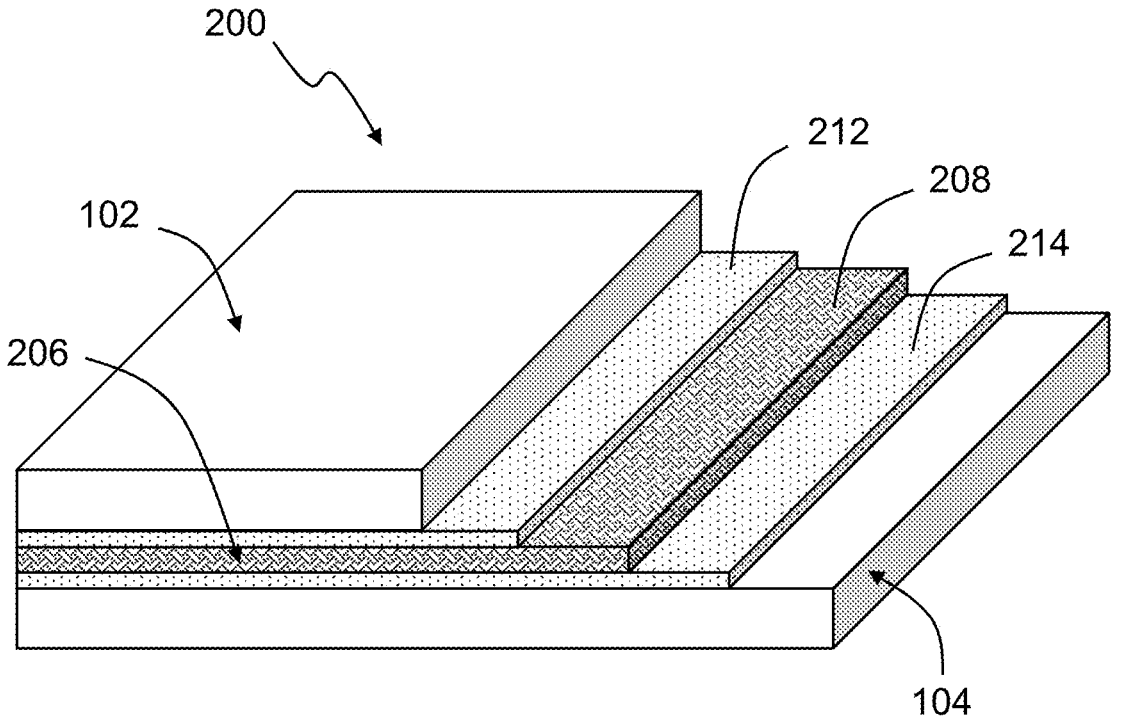
FIG. 2 illustrates a portion of another conveyor belt in a perspective sectional view, in accordance with another embodiment of the present disclosure.
Figure 3:
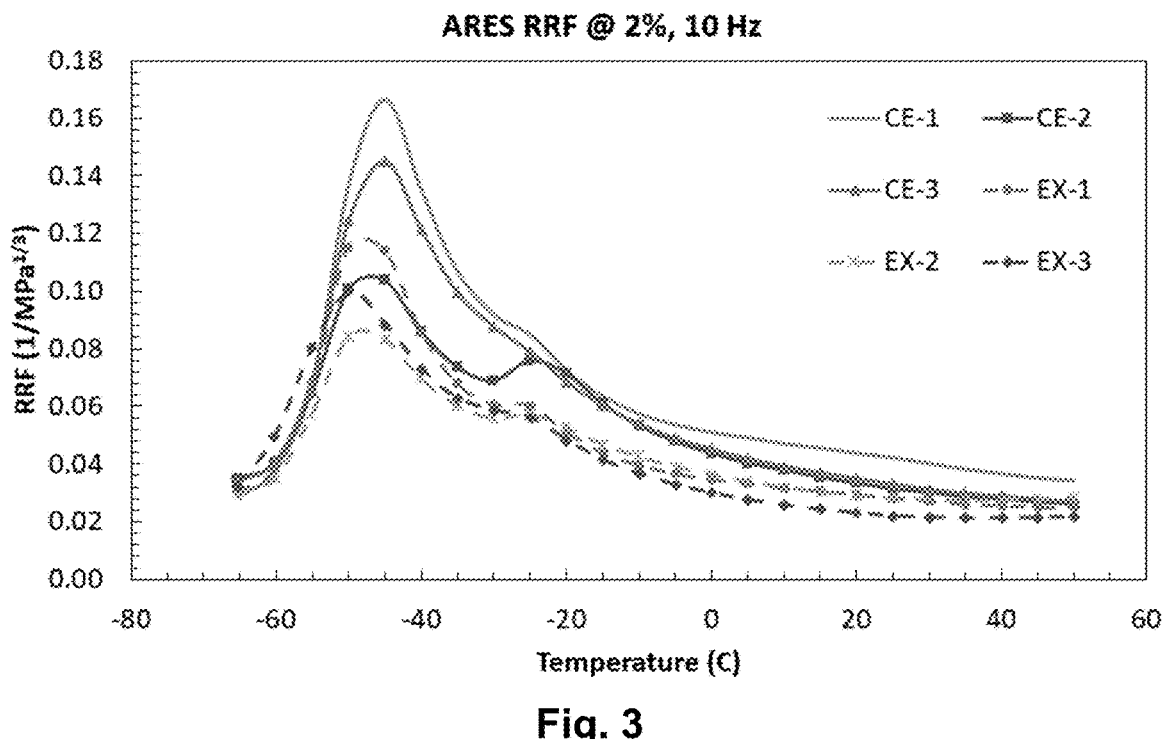
FIG. 3 illustrates rolling resistance factor data according to examples.
Figure 4:
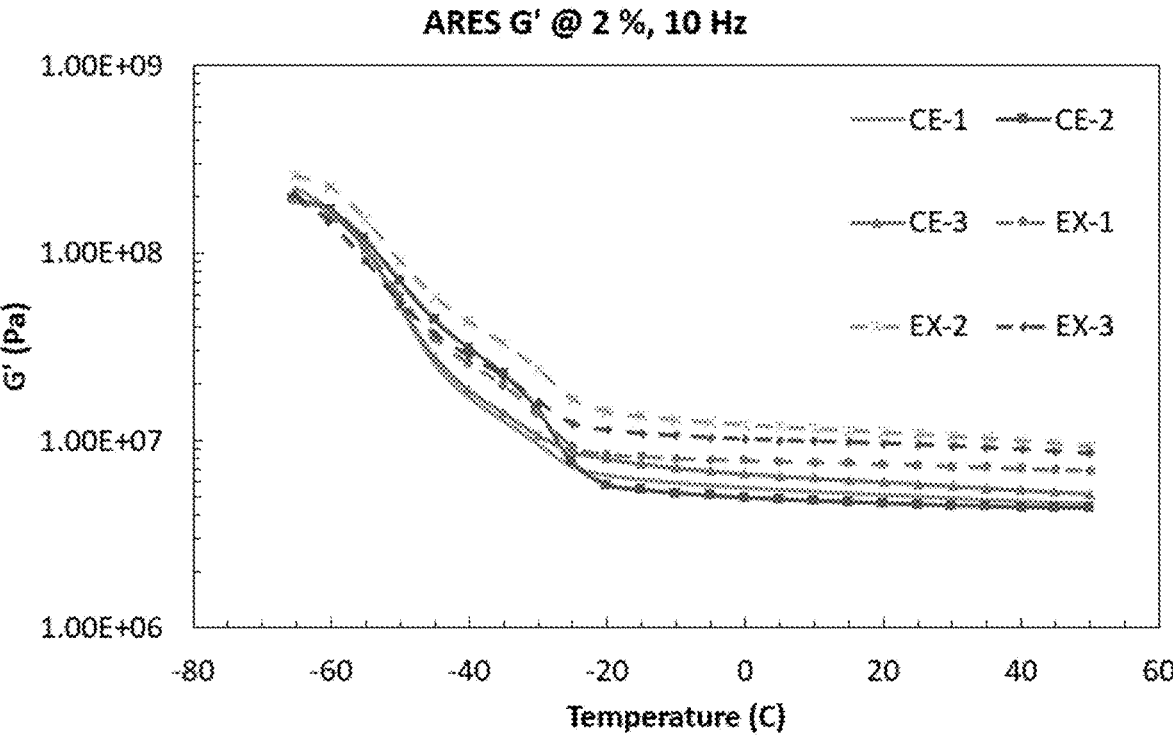
FIG. 4 illustrates storage modulus data according to examples.
Figure 5:
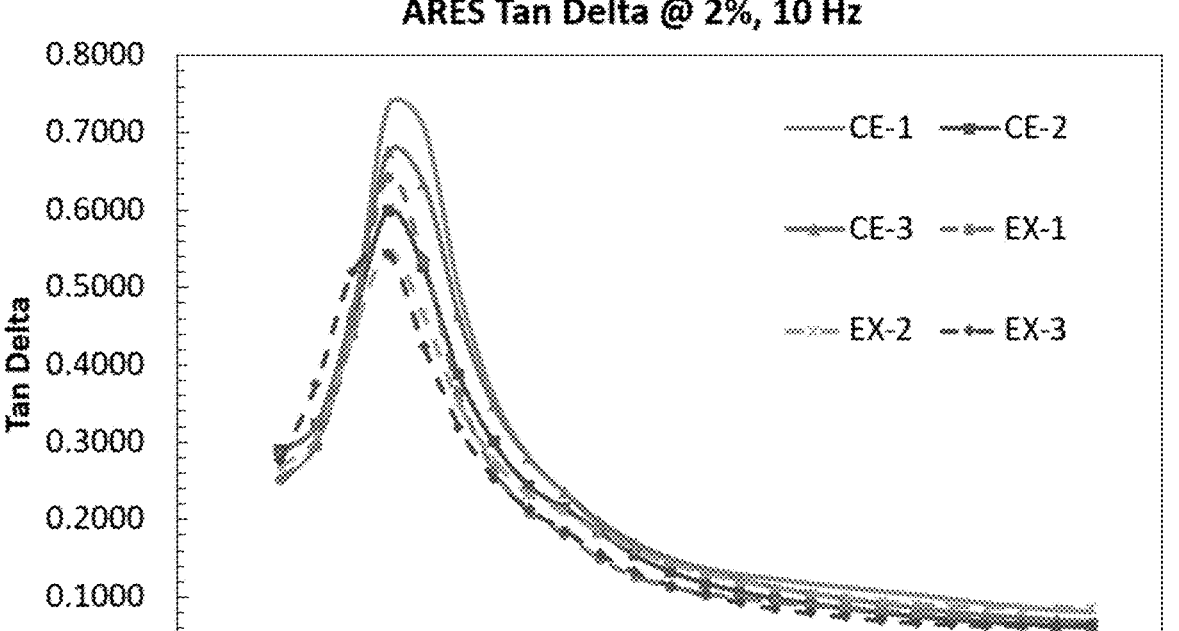
FIG. 5 illustrates tan delta data according to examples.

FIG. 2 shows a portion of another exemplary conveyor belt 200, which is constructed substantially similar to the belt 100, except that reinforcement layer 206 of belt 200 includes one or more plies of textile 208 instead of reinforcement cords. In the illustrated embodiment, for example, the textile 208 of reinforcement layer 206 includes at least one fabric which may be formed from materials such as aramid, polyester, nylon, or any other suitable material or any suitable combination thereof. The textile 208 may be attached to the top and bottom cover layers 102, 104 with respective skim layers 212, 214 which coat opposite surfaces of the textile 208 and together form the reinforcement layer 206 or carcass of the belt. Multiple textile layers 208 with skim layer(s) 212 and/or 214 between the textile layers may be utilized as desired to form the reinforcement layer 206. Such a conveyor belt 200 may be assembled initially by applying the skim layers 214, 216 to the opposite surfaces of the textile 208 by a process such as calendaring to form the reinforcement layer 206. Then, the top and bottom cover layers 102, 104 may be simultaneously (or sequentially) applied to the reinforcement layer 206 such as via calendaring. Once assembled, the conveyor belt 200 is vulcanized and may be cut into segments that are attached to each other via suitable splices to achieve the overall desired length of the belt.

Such conveyor belts 100, 200 can vary greatly in size and length. For instance, the conveyor belts used in mining applications can be up to about three meters wide and very long, for example, on the order of many kilometers. The bottom (pulley) cover layer 104 of the conveyor belts may be of any suitable thickness, such as from about 1 mm to about 5 mm. The top (carry) cover layer 102 may have a total thickness of from about 4 mm to about 10 mm, for example. The overall thickness of the belt may be from about 4 mm to about 20 mm.

The top and bottom cover layers 102, 104 of the conveyor belt 100, 200 are formed from a suitable elastomeric material, which this material may be the same for both layers 102, 104, or may be different for each layer. The elastomeric body 110 and skim layers 212, 214 of the belt 100, 200 also may be the same or different from each other, and/or may be the same or different from one or more of the top and bottom cover layers 102, 104. When adjacent layers are formed from the same material, they may be attached to each other or may form a continuous unitary structure. When adjacent layers are made from different materials, they generally are formed from materials that are compatible with each other to promote suitable attachment to each other.

According to exemplary embodiment(s) of the present disclosure, the exemplary elastomeric composition having the high aspect ratio nanofibers may form at least part or all of any or all of these layers of a conveyor belt, including for example, the top cover layer 102, the bottom cover layer 104, the carcass body 110, the skim layers 212 and/or 214, etc. In exemplary embodiments, at least the bottom cover layer 104 is formed from the exemplary elastomeric composition with the high aspect ratio nanofibers to thereby reduce the rolling resistance of this layer and improve the energy efficiency of the belt. In some embodiments, only the bottom layer 104 of the conveyor belt is formed with this exemplary elastomeric composition, such as to reduce overall cost or other factors.

The details of the exemplary elastomeric composition having the high aspect ratio nanofibers will be further described hereinbelow according to embodiment(s) of the present disclosure.

Elastomeric Composition

The exemplary elastomeric composition includes at least one base elastomer and one or more types of the high aspect ratio nanofibers. The exemplary composition also may contain one or more of the following additional ingredients: one or more additional reinforcing agent(s), one or more plasticizer(s), one or more processing aid(s), one or more antidegradant(s), one or more activator(s), one or more vulcanizing agent(s), one or more accelerator(s), and optionally further suitable ingredient(s) to achieve desired characteristic(s). Such ingredients of the exemplary elastomeric composition will be described in further detail below for sake of clarity and not limitation, it being understood that certain embodiments may provide different suitable combinations of these ingredient types and/or amounts, may include one or more additional ingredients or alternative equivalent ingredients in any suitable combination, or may eliminate one or more of these ingredients in any suitable combination, as would be understood by those having ordinary skill in the art in view of the teachings provided herein.

Base Elastomer(s)

The one or more elastomer(s) of the composition form at least part of the matrix and serve as the base of the elastomeric composition. The composition also may contain other polymer(s), such as non-elastomer polymer(s), that are blended with the base elastomer(s) to also form part of the matrix of the composition. The total polymer content forming the base composition (including mixtures of base polymers) is set at 100 phr. The polymer matrix of the elastomeric composition generally will be formed from a majority of elastomer material(s) as opposed to other types of non-elastomer base polymer(s) to provide elastic properties, for example at least 80%, or at least 90% or more elastomer material(s) forming the polymer matrix. The additives in the composition are compounded relative to the total base polymer content of the composition, and as such may be represented in parts per hundred (phr), which means parts by weight per 100 parts by weight of the base polymer(s).

For elastomeric articles, in general, example base polymer(s) may include natural rubber (NR), epoxidized natural rubber (ENR), polybutadiene elastomer (BR), acrylonitrile butadiene elastomer (NBR), carboxylated nitrile elastomer (XNBR), (partially) hydrogenated nitrile elastomer (HNBR), styrene butadiene elastomer (SBR), carboxylated styrene-butadiene elastomer (XSBR), styrene/ethylene-butylene/styrene-based elastomer (SEBS), ethylene propylene monomer elastomer (EPM), ethylene propylene diene monomer elastomer (EPDM), chloroprene elastomer (CR), isoprene elastomer (IR), butyl elastomer (IIR), bromobutyl elastomer (BIIR), chlorobutyl elastomer (CIIR), chlorinated polyethylene elastomer (CPE), chlorosulfonated polyethylene elastomer (CSM), alkylated chlorosulfonated polyethylene elastomer (ACSM), polyepichlorohydrin elastomers (CO; ECO; ETER), ethylene-vinyl acetate elastomer (EVA), acrylate elastomer (ACM), ethylene-acrylate elastomer (AEM), silicone elastomer (MQ, VMQ, PVMQ, FVMQ), fluorine elastomer (FKM), fluorinated methylsilicone elastomer (MFQ), perfluorinated propylene elastomer (FFPM), perfluorocarbon elastomer (FFKM), thermoplastic elastomers (TPE), thermoplastic vulcanizates (TPV), thermoplastic polyurethanes (TPU), polyolefin elastomers (POE), polyvinylchloride (PVC), and/or polyurethane (PU), or the like, or blends thereof.

In exemplary embodiments, the elastomeric composition includes at least one polybutadiene elastomer (also referred to as butadiene rubber, or BR). Polybutadiene elastomer is a synthetic rubber that is derived from the polymerization of butadiene monomer. The polybutadiene elastomer is a resilient material with a low glass transition (Tg) and provides good dynamic performance and abrasion resistance. This makes the polybutadiene elastomer particularly suitable for use in a conveyor belt cover layer compound, and more particularly the bottom (pulley) cover layer of the conveyor belt.

The polybutadiene elastomer(s) may be present in the composition in any suitable amount. For example, the total amount of polybutadiene elastomer(s) present in the composition may be in a range from about 30 phr to about 70 phr, more particularly from about 40 phr to about 80 phr (including all values and ranges between the stated values).

The elastomeric composition may further include one or more natural rubber(s) (NR) to provide a balance of flexibility, improve processability, and improve tear/cut strength. Natural rubber is derived from plant-based material (e.g., rubber tree, dandelion, or other latex producing plant). Alternatively or additionally, the composition may contain polyisoprene elastomer(s) (IR) which generally is a synthetic form of natural rubber formed from the polymerization of isoprene monomers and designed to mimic the structure and properties of natural rubber, offering similar elasticity and resilience. Suitable polyisoprene elastomer(s) may be high-cis type (e.g., about 98.5%), for example.

The natural rubber(s) and/or the polyisoprene elastomer(s) may be present in the elastomeric composition in any suitable amount, such as in a range from about 30 phr to about 70 phr, more particularly from about 40 phr to about 80 phr (including all values between the stated values or ranges and subranges between such values).

A mass (phr) ratio of the one or more polybutadiene elastomer(s) to the one or more natural rubber(s) and/or the one or more polyisoprene elastomer(s) may be in a range from about 30:70 to about 70:30, more particularly from about 40:60 to 60:40 (including all values between the stated values or ranges and subranges between such values).

The use of other elastomer(s) such as ethylene propylene diene monomer (EPDM) also is possible for the elastomeric composition, which EPDM could constitute up to 100 phr of the composition or a fraction thereof. However, in an application such as a conveyor belt cover layer, the heat resistance of EPDM may not be required, and thus the elastomeric composition may be free of EPDM. As such, in certain embodiments, the base elastomer(s) of the elastomeric composition may consist of only (i) the one or more polybutadiene elastomers and (ii) the one or more natural rubber(s) and/or one or more polyisoprene elastomer(s), which together can form 100 phr of the elastomeric composition.

High Aspect Ratio Nanofibers

The one or more types of high aspect ratio nanofibers contained in the elastomeric composition may be of any suitable type or combination of types and may be provided in any suitable amount(s) as may be desired for the application.

Generally, the high aspect ratio nanofibers (also referred to herein simply as "nanofibers" or "NF") may serve as a highly effective reinforcing agent in the composition, and thus may enable the reduction of the total amount of all reinforcing agent(s) in the composition while providing suitable mechanical properties, such as tensile strength and/or abrasion resistance. This lower total loading of reinforcing agent(s), in turn, also increases the elastomer-to-elastomer contact in the composition, which can therefore improve rolling resistance.

As used herein, the term "high aspect ratio" as referring to the nanofibers means an aspect ratio (length over diameter) in a range from about 500 to about 15,000. In certain embodiments, the high aspect ratio nanofibers may have an aspect ratio (length to width) in a range from about 500 to about 5,000; more particularly from about 1,000 to about 2,500; more particularly from about 1,000 to about 2,000; or even more particularly from about 1,250 to about 1,750 (including all values between the stated values or ranges and subranges between such values).

As used herein the term "nano" as referring to the nanofibers means a diameter in a range from about 10 nm to about 1,000 nm. In certain embodiments, the high aspect ratio nanofibers may have a diameter in a range from about 100 nm to about 1,000 nm; more particularly from about 400 nm to about 700 nm (including all values between the stated values or ranges and subranges between such values). In some embodiments, testing has shown that a larger diameter nanofiber (e.g., 700 nm) as compared to a smaller diameter nanofiber (e.g., 400 nm) may exhibit preferred characteristics in terms of retaining tensile strength while improving rolling resistance, possibly due to improved dispersion of the larger size nanofiber.

In certain embodiments, the high aspect ratio nanofibers may have a length in a range from about 0.25 mm to about 5 mm; more particularly from about 0.5 mm to about 3 mm; or even more particularly from about 0.5 mm to about 1.5 mm (including all values between the stated values or ranges and subranges between such values).

In exemplary embodiments, the high aspect ratio nanofibers may be present in the elastomeric composition in a total amount from about 1 phr to about 10 phr (including all values between the stated values or ranges and subranges between such values). In certain embodiments, an effective range of the total high aspect ratio nanofiber content may be more particularly from about 1 phr to about 5 phr. As described in further detail below, it also has been found that an even narrower range of total high aspect ratio nanofiber content of less than about 5 phr, such as from about 1 phr to about 3 phr, may be even more effective in certain embodiments, whereas beyond about 10 phr, or about 5 phr, or even beyond about 3 phr, according to some embodiments, the mechanical properties of the composition may deteriorate. In addition, at such relatively low loading of the nanofibers, it has been found that the elastomeric composition may exhibit a relatively lower degree of anisotropy in terms of mechanical properties, which may be preferred.

In exemplary embodiments, the high aspect ratio nanofibers may be derived from conjugate fibers dispersed in the uncured elastomeric composition during processing. A conjugate fiber is a type of synthetic fiber that is formed from two or more chemically distinct materials to form a single fiber. As such, the conjugate fiber may be a multicomponent fiber or a bicomponent fiber, which is formed from two or more distinct types of polymers, for example, in which the nanofibers form at least part of this conjugate fiber structure.

In exemplary embodiments, the conjugate nanofibers may have a sea-island fiber morphology in which, for each conjugate fiber, the nanofibers form islands within a sea of polymeric material. A mass ratio of the fibers forming the islands to the polymeric material forming the sea may be in a range from about 60:40 to about 95:5; more particularly, from about 60:40 to about 75:25; and even more particularly from about 50:50 to about 70:30, such as about 50:50 or about 67:33, for example.

The high aspect ratio nanofibers may be formed from one or more of polyethylene terephthalate (PET), polyamide (nylon 6, nylon 6,6), and/or naturally-derived (e.g., cellulose-based) material, for example. This is the case whether or not the nanofibers are in the form of the sea-island conjugate fiber. When in the form of sea-island conjugate fiber, the polymeric material forming the sea may be a thermoplastic polymer, such as polyethylene, ethylene-vinyl acetate copolymer, polyamide, or the like.

Generally, the nanofiber islands of the sea-island conjugate fiber are discrete with respect to each other and extend parallel to each other as surrounded by the polymer (e.g., thermoplastic) sea. This sea-island structure can facilitate dispersion during mixing, as the polymer sea may be adapted to melt during the mixing process whereby it diffuses into the elastomer matrix leaving the nanofiber components to reinforce the matrix. Due to such melting and dispersing, it may be preferred that the polymer has good compatibility with the elastomer matrix material.

Because the polymer sea of the sea-island conjugate fiber may melt away in the final product, it is understood that when such material is used, the above-noted total amounts of the one or more types of high aspect ratio nanofiber(s) means the total nanofiber (island) amount and does not include the polymer sea amount, unless otherwise specified. In the examples noted below, if a sea-island conjugate fiber is used, the formulation will specify the total sea-island conjugate fiber amount (both nanofiber island and polymer sea) and will include the nanofiber amount in parenthesis based on the weight fraction thereof. As an example, 2.86 phr of a conjugate sea-island fiber containing 67% nanofiber and 33% sea means that 2 phr of nanofiber is contained in the final elastomeric composition, and will be listed as 2.9 phr (1.9 phr fiber); or 1.4 phr of the same sea-island conjugate fiber means that 1 phr of nanofiber remains and will be listed as 1.4 phr (0.9 phr fiber).

Additional Reinforcing Agent(s)

The elastomeric composition also may include one or more additional reinforcing agents other than the high aspect ratio nanofibers to enhance specific characteristics, such as the mechanical properties of the elastomeric composition. The additional reinforcing agent(s) may include, for example, one or more carbon black(s), silica(s), calcium carbonate(s) (chalk), clay(s) (kaolin), aluminum silicate(s), calcium silicate(s), magnesium silicate(s) (talc), or other ceramics or minerals, or mixtures thereof.

In exemplary embodiments, the elastomeric composition contains one or more different types of the additional reinforcing agent(s). The one or more additional reinforcing agent(s) may be present in the composition in a total amount from about from about 30 phr to about 50 phr; more particularly from about 30 phr to about 45 phr; or even more particularly from about 35 phr to about 40 phr (including all values between the stated values or ranges and subranges between such values).

As described above, the presence of the high aspect ratio nanofibers, and in particular a relatively low and limited amount of such nanofibers, is capable of enabling a reduction in overall reinforcing agent content while still attaining suitable mechanical properties as desired for the application. For example, as a cover layer of a conveyor belt (e.g., bottom cover layer), the elastomeric composition should have at least a suitable tensile strength, modulus at 25%, and abrasion resistance for the application, of which such properties are disclosed in further detail below.

In exemplary embodiments, a total amount of all reinforcing agents in the composition, including the high aspect ratio nanofibers and the one or more additional reinforcing agent(s), is present in a range from about 30 phr to about 60 phr, more particularly from about 30 phr to about 50 phr, or even more particularly less than 50 phr, such as from about 30 phr to about 40 phr (including all values between the stated values or ranges and subranges between such values), while attaining the desired mechanical properties. As an example, a phr ratio of the total amount of the high aspect ratio nanofibers, in phr, to the total amount of all additional reinforcing agent(s) in the composition, in phr, may be from about 1:60 to about 10:30 (including all values and ranges therebetween). Generally, if too much total reinforcing agent is present, such as greater than the above-identified range(s), the elastomeric composition may become excessively stiff and less elastic, leading to a reduction in flexibility and elongation at break. If too little total reinforcing agent is added, such as below the above-identified range(s), the reinforcing effect may not be sufficient, leading to weaker mechanical properties of the composition.

Again, because the high aspect ratio nanofibers are a highly effective reinforcing agent, the use of a relatively small amount of nanofibers (e.g., 10 phr or less) can result in a reduction of all other reinforcing agent(s) by a greater amount than the amount of nanofibers added, while still attaining the desired mechanical properties. So, for example, a 1 phr or 2 phr addition of nanofibers to a composition may enable a reduction of the total other reinforcing agent(s) by 15% or more, such as a reduction of 20% to 30% (e.g., reduced from 50 phr down to 35 phr or 40 phr), as described in further detail below. The mass balance of reducing the overall reinforcing agent content can then be accounted for by a corresponding increase in the weight percent of elastomer content which improves rolling resistance.

In certain embodiments, the elastomeric composition contains one or more types of carbon black(s) as at least one of the additional reinforcing agent(s). Typically, carbon blacks use a naming convention as specified by ASTM D1765 to identify the particular type and size of the carbon black. For N-series carbon blacks, grades range from N110 to N990, in which the first numerical digit designates a size or surface area of the carbon black, and the last two numerical digits designate the structural complexity of the carbon black. A lower first digit (e.g., N100-series) has a smaller particle size, and thus higher surface area, than a higher first digit (e.g., N900-series). Unlike virgin carbon black, recovered carbon black (rCB) does not use the same N-number designation system according to ASTM D1765; however, the rCB still may have at least an equivalent mean particle size as N-series designated virgin carbon black, and thus any designation of an N-type carbon black as used herein encompasses both virgin and other types of equivalent carbon black (e.g., rCB) unless specifically stated otherwise.

In exemplary embodiments, the elastomeric composition contains carbon black(s) in a range between N300-series (e.g., $N_2$ surface area from about 70 $m^2/g$ to about 99 $m^2/g$ according to ASTM D3037) and N700-series (e.g., $N_2$ surface area from about 21 $m^2/g$ to about 32 $m^2/g$), more particularly in a range between N300-series and N500-series (e.g., an $N_2$ surface area from about 40 to about 49 $m^2/g$) (including all values and ranges therebetween), in which such carbon blacks(s) are present in the above-noted amounts for the additional reinforcing agent(s)—e.g., in a total amount from about from about 30 phr to about 60 phr (or subranges thereof). A suitable phr ratio of the smaller size carbon black (e.g., N300-series) to the larger size carbon black (e.g., N500-series) may be from about 10:50 to about 50:10; more particularly from about 10:25 to about 25:10 (including all values and ranges therebetween)

The elastomeric composition may contain one or more additional types of reinforcing agent(s) other than carbon black(s), for example, silica(s). However, it may be advantageous that the elastomeric composition is devoid of any silica and/or contains only carbon black and the nanofiber as the only reinforcing agent(s), since the carbon black can improve the electrical conductivity properties of the composition and can control mechanical properties such as tensile strength and abrasion resistance. In addition, the absence of silica may obviate the use of silane coupling agents in the composition.

In certain embodiment(s) in which at least one high-surface area silica is contained in the elastomeric composition, it may be present in a total amount from about 30 phr to about 60 phr; more particularly from about 30 phr to about 50 phr, even more particularly less than 50 phr, while still attaining suitable mechanical properties and enabling reduction in overall reinforcement loading in the composition. One or more of the silica(s) may be high surface area (precipitated) silica(s). The silica(s) may have a CTAB surface area (according to ASTM D 3765) of 30 to 350 $m^2/g$, more particularly from 110 to 250 $m^2/g$ s. It is understood that other reinforcement agent(s) may be used with the silica(s), such as carbon black(s), in which case such carbon black(s) may be present (along with the silica(s)) in a range from about 1 phr to about 10 phr. When such silica(s) are used, a suitable coupling agent also may be utilized, such as a silane coupling agent (e.g., a di- tri- or tetra-sulfide silane) which may be present in a suitable amount based on the amount of silica(s).

In exemplary embodiment(s), the elastomeric composition is devoid of other fiber reinforcing agent(s) other than the high aspect ratio nanofiber(s), carbon black(s), and optionally silica(s). More particularly, the elastomeric composition may be devoid of dispersed short fibers (e.g., diameters greater than 1 micron), for example, chopped glass fibers, chopped cotton fibers or the like, as these types of materials are not conventionally used in conveyor belt and do not provide equivalent performance to the highly effective reinforcing nature of the high aspect ratio nanofibers described herein.

Plasticizer(s)

The elastomeric composition may contain one or more plasticizers to increase flexibility, reduce hardness, and/or improve the processing characteristics of the composition. The plasticizer(s) may be of any suitable type or combination of types and may be in any suitable amount(s) as may be desired for the application. For example, the plasticizer(s) may include mineral oils, paraffinic oils, naphthenic oils, aromatic oils, vegetable oils, epoxidized oils, synthetic polymer plasticizers (e.g., liquid polybutene), ester plasticizers (e.g., esters of polycarboxylic acids such as adipic, phosphoric, phthalic, sebacic and higher aliphatic alcohols or phenols), phthalate plasticizers (e.g., Dibutyl phthalate, di-2-ethylhexyl phthalate), sebacate plasticizers (e.g., di-2-ethylhexyl sebacate), phosphate plasticizers (e.g., tricresyl phosphate), ether plasticizers (e.g., dibenzyl ether, polyethers or polyether-thioethers), or the like, or mixtures thereof.

The plasticizer(s) may be present in the elastomeric composition in a total amount from about 1 phr to about 10 phr, more particularly from about 1 phr to about 5 phr, such as about 1, 2, 3, 4, 5, or 10 phr. Polymeric forms of the plasticizer(s) are not calculated in the formulation as part of the base polymer content forming the matrix—i.e., they do not constitute part of the 100 phr base polymer of the composition.

It has been found that an increase in plasticizer oil(s) may reduce the rolling resistance factor of the elastomeric composition. Therefore, in exemplary embodiments, the elastomeric composition is devoid or essentially devoid of plasticizer oil. The elastomeric composition also may be devoid or essentially devoid of any or all of the above-identified types of plasticizer(s) to provide the desired properties of the article, such as at least the bottom cover layer of a conveyor belt.

Processing Aid(s)

The elastomeric composition also may include one or more processing aids to improve processing flow, dispersion of fillers, etc. Examples of processing aid(s) may include hydrocarbon (HC) resins, thermoplastic (TP) phenolic resins, fatty acid salts (e.g., zinc stearate, calcium stearate), fatty acid esters, or the like, or mixtures thereof.

The one or more processing aid(s) may be present in the elastomeric composition in a total amount from about 1 phr to about 10 phr, more particularly from about 1 phr to about 5 phr, such as about 1, 2, 5, 7 or 10 phr. Polymeric forms of the processing aid(s) are not calculated in the formulation as part of the base polymer content forming the matrix—i.e., they do not constitute part of the 100 phr base polymer of the composition.

Antidegradant(s)

The elastomeric composition may contain one or more antidegradant(s), which may include antioxidants and/or antiozonants, to prevent oxidation and/or the damaging effects of ozone, which can cause cracking and deterioration of the composition. Examples of the antidegradant(s) may include, for example, amines (e.g., naphthylamines, diphenyl amine derivatives, paraphenylenediamines such as N-phenyl-N'-(1,3-dimethylbutyl)-p-phenylenediamine (6PPD), N,N'-diphenyl-p-phenylenediamine (DPPD), N,N'-ditolyl-p-phenylenediamine (DTPD), N-isopropyl-N'-phenyl-p-phenylenediamine (IPPD)), quinolines (e.g., dihydroquinolines such as 2,2,4-trimethyl-1,2-dihydroquinoline (TMQ)), thioesters (e.g., bis-(alkylthiopropionate)diesters, alkylthiodipropionate esters), dithiocarbamates (e.g., nickel or zinc salt thereof), 2-Mercaptobenzimidazole (MBI) (including its metal salt (e.g., Zinc 2-mercaptotolumidazole) (ZMTI)), hydrocarbon wax(es), or the like, or mixtures thereof.

The antidegradant(s) may be present in the elastomeric composition in a total amount from about 1 phr to about 10 phr, more particularly from about 1 phr to about 5 phr (including all values between the stated values or ranges and subranges between such values).

Activator(s)

The elastomeric composition may include one or more activators to help activate the curing system and promote the formation of crosslinks between polymer chains during vulcanization. Any suitable activator(s) or combination of activator(s) in any suitable quantity may be utilized in the elastomeric composition. For example, activator(s) may include zinc oxide, fatty acids or soaps (e.g., stearic acid, lauric acid, etc.), zinc complexes (e.g., zinc soap), or the like, or mixtures thereof.

The activator(s) may be present in the elastomeric composition in a total amount from about 1 phr to about 15 phr, more particularly from about 4 phr to about 10 phr (including all values between the stated values or ranges and subranges between such values).

Accelerator(s)

The elastomeric composition also may contain one or more accelerators to accelerate the cure of the composition. The accelerator(s) may include thiazole accelerators, mercapto accelerators (e.g., including 2-Mercaptobenzothiazole such as Benzothiazyl Disulfide (MBTS), Zinc 2-Mercapto-benzothiazole (ZMBT)), sulfenamide accelerators (e.g., N-cyclohexyl-2-benzothiazolesulfenamide (CBS), N,N-di-cyclohexylbenzothiazole-2-sulfenamide (DCBS), benzothi-azyl-2-sulfenomorpholide (MBS), N-tert-butyl-2-benzothi-azylsulfenamide (TBBS)), thiocarbamate accelerators (ZDMC, ZDEC, ZDBC, ZEPC), thiuram accelerators (e.g., tetrabenzylthiuram disulfide (TBzTD), tetramethylthiuram disulfide (TMTD) or tetraethylthiuram disulfide (TETD), thiuram tetrasulfides, for example dipentamethylenethiuram tetrasulfide (DPTT), thiophosphate accelerators, thiourea accelerators, xanthogenate accelerators and/or guanidine accelerators (e.g., diphenylguanidine (DPG), di-o-tolyl gua-nidine (DOTG)).

The accelerator(s) may be present in the elastomeric composition in a total amount from about 1 phr to about 5 phr.

Retardant(s)

The elastomeric composition also may contain one or more retardant(s) to retard the cure of the composition. The retardant(s) may be present in the elastomeric composition in a total amount from about 0.25 phr to about 1 phr, for example. An example of a suitable retardant may be a phthalimide type, such as N-(Cyclohexylthio)phthalimide (PVI), which may be provided in the above-identified range.

Vulcanizing Agent(s)

The elastomeric composition also contains one or more vulcanizing agent(s) or curative(s) that cross-link the poly-mer chains in the base polymer(s), making the composition more elastic and less prone to permanent deformation. The vulcanizing agent(s) may include sulfur and/or sulfur donors, or peroxides (e.g., organic peroxides such as dicumyl peroxide, bis-(t-butyl peroxy-diisopropyl benzene, t-butyl perbenzoate, di-t-butyl peroxide, 2,5-dimethyl-2,5-di-t-butylperoxyhexane, alpha-alpha-bis(t-butylperoxy) diisopropylbenzene). It is understood that some of the accel-erators listed above may simultaneously be sulfur donors, but they generally are not considered direct substitutes for free sulfur in the context of a vulcanizing agent.

The vulcanizing agent(s) may be present in a total amount from about 1 phr to about 5 phr, more particularly from about 2 phr to about 3 phr. In exemplary embodiments, the vulcanizing agent includes sulfur as the vulcanizing agent, which is provided in the above-identified range(s).

Material Properties

As noted above, the elastomeric composition may have properties that make it particularly suitable for conveyor belt applications, more particularly for the bottom cover layer of a conveyor belt. More specifically, the inclusion of the high aspect ratio nanofibers and reduction of the overall reinforc-ing agent content has been found to improve one or more characteristics of the elastomeric composition as compared against a comparative composition having the same basic composition as the elastomeric composition but without the high aspect ratio nanofibers and with a greater total rein-forcement loading.

For example, the exemplary composition with the high aspect ratio nanofibers may have a decreased average rolling resistance factor over a temperature range from at least −20° C. to +20° C., as compared against the comparative composition, and even more particularly in a range from −40° C. to +40° C., as measured according to ARES (advanced rheometrics expansion system) testing. In exemplary embodiments, the average rolling resistance factor of the exemplary elastomeric composition with nanofibers may be decreased by up to 20% over the temperature range (−20° C. to +20° C.) as compared to the comparative composition.

The exemplary elastomeric composition with nanofibers also may have little to no reduction in original (unaged) tensile strength compared to the comparative composition, more particularly no reduction or a reduction of less than 10%, as tested according to ASTM D412.

For example, the exemplary elastomeric composition with nanofibers may have a tensile strength according to ASTM D412 of greater than 1800 psi, such as in a range of 1800 psi to 3500 psi, for example.

The exemplary elastomeric composition with nanofibers also may have little to no reduction in original modulus at 25% as compared to the comparative composition, more particularly no reduction or a reduction of less than 10%, and even more particularly an increase in modulus at 25%, as tested according to ASTM D412.

The exemplary elastomeric composition with nanofibers also may have little to no reduction in DIN abrasion resis-tance as compared to the comparative composition, more particularly no reduction or a reduction of less than 10%, as tested according to ASTM D5963.

For example, the exemplary elastomeric composition with nanofibers may have a DIN abrasion resistance according to ASTM D5963 of less than 100 mm$^3$, or even more particu-larly less than 75 mm$^3$, for example.

Because of the dispersed fiber content, the mechanical property values of tensile and modulus at 25% are under-stood to be "with" the processing direction—i.e., in the direction of the nanofibers, which generally orient in the processing direction during fabrication.

In exemplary embodiments, the exemplary elastomeric composition with nanofibers may also exhibit relatively low anisotropy due to a relatively low loading of the high aspect ratio nanofibers. For example, in certain embodiments, a ratio of modulus at 25% measured parallel to an orientation of the nanofibers (modulus at 25% with fiber) (e.g., in the processing direction) relative to modulus at 25% measured perpendicular to an orientation of the nanofibers (modulus at 25% against fiber), as measured according to ASTM D412, may be in a range from 1.0 to 2.0, more particularly from 1.0 to 1.5.

Examples

Elastomeric compositions were prepared and tested for the purpose of further illustrating the nature of some of the embodiments and aspects of the present disclosure and are not intended as a limitation on the scope thereof. The test data for these evaluations are shown in Tables 1 through 10 and in FIGS. 3 through 17. In the test data the evaluations for tensile strength, elongation %, and modulus were con-ducted according to ASTM D412, and are shown as original (unaged) properties. Hardness testing was conducted according to ASTM D2240. DIN abrasion resistance testing was performed in accordance with ASTM D 5963 (no orientation with respect to fiber direction). Mooney scorch was conducted on a Mooney tester according to the Mooney Scorch ASTM D1646 standard. Die C Tear testing was conducted with fiber direction according to ASTM D624 standard. Rolling resistance testing was conducted accord-ing to testing on an ARES (advanced rheometrics expansion system) apparatus under the principles laid out in ASTM D5992.

Referring to Table 1, various elastomeric formulations for different test samples are shown. This includes three comparative examples (CE-1, CE-2, CE-3) that do not contain high aspect ratio nanofiber, and three examples (EX-1, EX-2, EX-3) containing high aspect ratio nanofiber. The examples used a blend of polybutadiene elastomer and natural rubber (or IR) constituting 100 phr of the compositions. The carbon black(s) used in the examples were one or more types in the N300-series to N500-series range. The plasticizer(s), processing aid(s), activator(s), antidegradant (s), accelerator(s), retardant(s), etc. were in accordance with the above. The high aspect ratio nanofiber used in EX-1, EX-2, and EX-3 was derived from a conjugate fiber having a sea-island morphology, in which the nanofiber islands are formed from PET and the sea is formed from PE. The total amount of the sea-island conjugate fiber (both nanofiber island and polymer sea) in the formulation as-blended is shown outside of parenthesis and the nanofiber amount is shown inside of the parenthesis based on the weight fraction thereof. Two versions of this high aspect ratio nanofiber were tested, including one with fiber diameters of about 400 nm and a length of about 1.0 mm (2500 aspect ratio), and one with fiber diameters of about 700 nm and a length of about 1.0 mm (1429 aspect ratio).

TABLE 1

| Ingredient | units | CE-1 | CE-2 | CE-3 | EX-1 | EX-2 | EX-3 |
|---|---|---|---|---|---|---|---|
| Elastomer: BR(s) + NR(s)/IR(s) | phr | 100 | 100 | 100 | 100 | 100 | 100 |
| Nanofiber: 700 nm*1 mm | phr | — | — | — | — | 6 (4) | 6 (4) |
| Nanofiber: 400 nm* 1 mm | phr | — | — | — | 6 (3) | — | — |
| Carbon Black(s): N300-N500 | phr | 50 | 3 | 3 | 42.5 | 3 | 3 |
| HSA (precipitated) Silica(s) | phr | — | 34 | 42 | — | 41 | 35 |
| Plasticizer Oil(s) | phr | — | 2 | 2 | — | 2 | 2 |
| Process Aid(s) | phr | 2 | 1 | 1 | 2 | 1 | 1 |
| Activator(s) | phr | 5.3 | 7.5 | 7.5 | 5.3 | 7.5 | 7.5 |
| Antidegradant(s) | phr | 4 | 5.75 | 5.75 | 4 | 5.75 | 5.75 |
| Coupling agent: Silane | phr | — | 8 | 8 | — | 8 | 8 |
| Vulcanizing Agent: Sulfur | phr | 2.25 | 2 | 2.25 | 2.25 | 2.25 | 2.25 |
| Accelerator(s) | phr | 1.5 | 2.25 | 2.35 | 1.5 | 2.35 | 2.35 |
| Retarder(s) | phr | 0.2 | 0.25 | 0.25 | 0.2 | 0.25 | 0.25 |
| PHR Running Total: | phr | 165.25 | 165.75 | 173.1 | 163.75 | 179.1 | 173.1 |

Table 2 shows the results of mechanical testing the samples from Table 1, including original (unaged) properties with or against nanofiber direction (where applicable).

TABLE 2

| | Unit | CE-1 | CE-2 | CE-3 | EX-1 | EX-2 | EX-3 |
|---|---|---|---|---|---|---|---|
| Orig. Mechanicals (With Fiber) | | | | | | | |
| Tensile | psi | 2283 | 2790 | 2511 | 1570 | 2103 | 1759 |
| Elongation | % | 334 | 572 | 525 | 253 | 478 | 361 |
| Mod 10 | psi | — | — | — | — | 125 | 161 |
| Mod 25 | psi | 182 | — | 316 | — | 201 | 284 |
| Mod 50 | psi | — | — | — | — | 310 | 479 |
| Mod 100 | psi | 488 | 390 | 379 | 759 | 572 | 700 |
| Mod 200 | psi | 1176 | 696 | 714 | 1249 | 821 | 1045 |
| Mod 300 | psi | 1994 | 1050 | 1158 | — | 1139 | 1472 |
| Hardness | Sh. A | 67 | 64 | 66 | 72 | 68 | 74 |

TABLE 2-continued

| | Unit | CE-1 | CE-2 | CE-3 | EX-1 | EX-2 | EX-3 |
|---|---|---|---|---|---|---|---|
| Orig. Mechanicals (Against Fiber) | | | | | | | |
| Tensile | psi | — | — | — | 1463 | 2432 | 1682 |
| Elongation | % | — | — | — | 258 | 495 | 387 |
| Mod 10 | psi | — | — | — | — | 172 | 130 |
| Mod 25 | psi | — | — | — | 219 | 268 | 213 |
| Mod 50 | psi | — | — | — | 325 | 367 | 308 |
| Mod 100 | psi | — | — | — | 759 | 516 | 461 |
| Mod 200 | psi | — | — | — | 1249 | 853 | 802 |
| Mod 300 | psi | — | — | — | — | 1278 | 1231 |
| Hardness | Sh. A | — | — | — | 72 | 71 | 71 |
| Tear and Abrasion | | | | | | | |
| Die C Tear | lb/in | 207 | 248 | 253 | 285 | 514 | 298 |
| DIN Abrasion | mm3 | 61 | 53 | 62 | 80 | 70 | 70 |

Table 3 shows the results of rheometer and Mooney scorch testing of the samples from Table 1.

TABLE 3

| | Unit | CE-1 | CE-2 | CE-3 | EX-1 | EX-2 | EX-3 |
|---|---|---|---|---|---|---|---|
| Rheometer @ 150 C. | | | | | | | |
| Min | (dNm) | 4.67 | 6.37 | 5.05 | 5.23 | 5.38 | 5.46 |
| Max | (dNm) | 36.21 | 37.76 | 36.84 | 36.89 | 37.82 | 36.21 |
| Tris1 | (min) | 3.46 | 2.68 | 1.95 | 5.51 | 2.32 | 2.86 |
| T25 | (min) | 7.44 | 10.46 | 11.09 | 11.57 | 10.4 | 9.83 |
| S25 | (dNm) | 12.56 | 14.22 | 13 | 13.15 | 13.49 | 13.15 |
| T90 | (min) | 10.81 | 16.25 | 16.6 | 17.88 | 16.56 | 15.24 |
| S90 | (dNm) | 33.06 | 34.62 | 33.66 | 33.72 | 34.58 | 33.13 |
| Rate | (dNm/min) | 10.09 | 5.33 | 5.66 | 7.61 | 5.25 | 7.2 |
| Amount | (dNm) | 31.54 | 31.39 | 31.79 | 31.66 | 32.44 | 30.75 |
| Mooney Scorch @ 121 C. | | | | | | | |
| Initial | (dNm) | 39.74 | 46.76 | 46.96 | 41.95 | 52.35 | 60.58 |
| ML | (dNm) | 29.62 | 40.07 | 34.63 | 30.37 | 36.44 | 37.12 |

Tables 4 and 5 show the results of rolling resistance testing of the samples from Table 1. This data corresponds to the graphical illustrations shown in FIGS. 3-5.

TABLE 4

| | Unit | CE-1 | CE-2 | CE-3 | EX-1 | EX-2 | EX-3 |
|---|---|---|---|---|---|---|---|
| ARES @ 40 C., 2% Strain, 10 Hz | | | | | | | |
| G' | (MPa) | 4.67 | 4.35 | 5.42 | 7.00 | 9.98 | 8.98 |
| Tan Delta | (unitless) | 0.088 | 0.065 | 0.073 | 0.071 | 0.086 | 0.064 |
| RRF | $(1/(Mpa)^{1/3})$ | 0.037 | 0.028 | 0.029 | 0.026 | 0.028 | 0.021 |
| RRF Index | (%) | 100.00 | 76.05 | 79.20 | 70.17 | 75.54 | 58.25 |
| ARES @ 25 C., 2% Strain, 10 Hz | | | | | | | |
| G' | (Mpa) | 4.97 | 4.50 | 5.83 | 7.32 | 10.82 | 9.54 |
| Tan Delta | (unitless) | 0.104 | 0.075 | 0.086 | 0.079 | 0.090 | 0.067 |
| RRF | $(1/(Mpa)^{1/3})$ | 0.042 | 0.031 | 0.033 | 0.028 | 0.028 | 0.022 |
| RRF Index | (%) | 100.00 | 74.55 | 78.73 | 66.95 | 66.91 | 52.13 |
| ARES @ 20 C., 2% Strain, 10 Hz | | | | | | | |
| G' | (Mpa) | 5.07 | 4.57 | 5.98 | 7.40 | 11.09 | 9.69 |
| Tan Delta | (unitless) | 0.108 | 0.080 | 0.092 | 0.083 | 0.094 | 0.070 |
| RRF | $(1/(Mpa)^{1/3})$ | 0.044 | 0.033 | 0.035 | 0.029 | 0.029 | 0.023 |

TABLE 5

| | Unit | CE-1 | CE-2 | CE-3 | EX-1 | EX-2 | EX-3 |
|---|---|---|---|---|---|---|---|
| ARES @ 0 C., 2% Strain, 10 Hz | | | | | | | |
| G' | (Mpa) | 5.53 | 4.89 | 6.60 | 7.75 | 12.12 | 10.20 |
| Tan Delta | (unitless) | 0.130 | 0.107 | 0.122 | 0.099 | 0.120 | 0.094 |
| RRF | $(1/(Mpa)^{1/3})$ | 0.051 | 0.044 | 0.045 | 0.035 | 0.036 | 0.030 |
| RRF Index | (%) | 100.00 | 85.96 | 89.07 | 68.06 | 71.50 | 58.87 |
| ARES @ −20 C., 2% Strain, 10 Hz | | | | | | | |
| G' | (Mpa) | 6.44 | 5.74 | 7.97 | 8.41 | 14.25 | 11.37 |
| Tan Delta | (unitless) | 0.195 | 0.185 | 0.198 | 0.150 | 0.184 | 0.156 |
| RRF | $(1/(Mpa)^{1/3})$ | 0.073 | 0.072 | 0.069 | 0.051 | 0.053 | 0.048 |
| RRF Index | (%) | 100.00 | 98.57 | 94.56 | 70.36 | 72.37 | 66.26 |
| ARES @ −40 C., 2% Strain, 10 Hz | | | | | | | |
| G' | (Mpa) | 16.93 | 30.92 | 18.63 | 25.56 | 42.84 | 28.24 |
| Tan Delta | (unitless) | 0.499 | 0.389 | 0.464 | 0.365 | 0.352 | 0.320 |
| RRF | $(1/(Mpa)^{1/3})$ | 0.135 | 0.086 | 0.121 | 0.086 | 0.070 | 0.073 |
| RRF Index | (%) | 100.00 | 63.70 | 90.02 | 63.74 | 51.75 | 54.01 |

As shown in the test results for the samples in Table 1, providing the high aspect ratio nanofiber in an amount up to about 4 phr exhibited improved rolling resistance factor over a relevant temperature range (e.g., −20° C. to +20° C., or −40° C. to +40° C.) as compared to the comparative examples without nanofiber. However, the results indicated that tensile strength was negatively affected. This led to additional study to reduce the total overall carbon black content and lower the overall nanofiber content to determine whether certain amounts of each could provide suitable results for each of rolling resistance factor, tensile strength, and abrasion resistance.

Referring to Table 6, additional elastomeric formulations for additional test samples are shown, including one comparative example (CE-4) that does not contain high aspect ratio nanofiber, and five examples (EX-4, EX-5, EX-6, EX-7, EX-8) containing high aspect ratio nanofiber. The examples used a blend of polybutadiene elastomer and natural rubber (or IR) constituting 100 phr of the compositions. The carbon black(s) used in the examples were one or more types in the N300-series to N500-series range. The plasticizer(s), processing aid(s), activator(s), antidegradant(s), accelerator(s), retardant(s), etc. were in accordance with the description above. The high aspect ratio nanofiber used in Examples 4 through 8 were the same as those in Table 1 for Examples 1-3.

TABLE 6

| Ingredient | units | CE-4 | EX-4 | EX-5 | EX-6 | EX-7 | EX-8 |
|---|---|---|---|---|---|---|---|
| Elastomer: BR(s) + NR(s)/IR(s) | phr | 100 | 100 | 100 | 100 | 100 | 100 |
| Nanofiber: 700 nm*1 mm | phr | — | 0 | 0 | 0 | 1.43 (1) | 2.86 (1.9) |
| Nanofiber: 400 nm* 1 mm | phr | — | 2 (1) | 2 (1) | 2 (1) | 0 | 0 |
| Carbon Black(s): N300-N500 | phr | 50 | 40 | 35 | 35 | 40 | 40 |
| Process Aid(s) | phr | 2 | 2 | 2 | 2 | 2 | 2 |
| Activator(s) | phr | 5.3 | 5.3 | 5.3 | 5.3 | 5.3 | 5.3 |
| Antidegradant(s) | phr | 4 | 4 | 4 | 4 | 4 | 4 |
| Vulcanizing Agent: Sulfur | phr | 2.25 | 2.25 | 2.25 | 1.9 | 2.25 | 1.9 |
| Retarder(s) | phr | 0.2 | 0.2 | 0.2 | 0.2 | 0.2 | 0.2 |
| Accelerator(s) | phr | 1.3 | 1.5 | 1.5 | 1.3 | 1.5 | 1.3 |
| PHR Running Total: | phr | 165.05 | 157.25 | 152.25 | 151.7 | 156.68 | 157.56 |

Table 7 shows the results of mechanical testing the samples from Table 6, including original (unaged) properties with or against nanofiber direction (where applicable). This data corresponds with the graphical illustration of stress v. strain shown in FIG. 6.

TABLE 7

| | Unit | CE-4 | EX-4 | EX-5 | EX-6 | EX-7 | EX-8 |
|---|---|---|---|---|---|---|---|
| Orig. Mechanicals (With Fiber) | | | | | | | |
| Tensile | psi | 2512 | 2260 | 2189 | 2316 | 2510 | 2389 |
| Elongation | % | 320 | 347 | 375 | 440 | 372 | 393 |
| Mod 10 | psi | 116 | 98 | 104 | 97 | 116 | 152 |
| Mod 25 | psi | 190 | 178 | 195 | 180 | 214 | 308 |
| Mod 50 | psi | 284 | 297 | 334 | 291 | 345 | 478 |
| Mod 100 | psi | 532 | 483 | 442 | 408 | 507 | 546 |
| Mod 200 | psi | 1365 | 1027 | 877 | 770 | 1079 | 994 |
| Mod 300 | psi | 2346 | 1811 | 1564 | 1344 | 1870 | 1659 |
| Hardness | Sh. A | 68 | 65 | 63 | 62 | 66 | 65 |
| Orig. Mechanicals (Against Fiber) | | | | | | | |
| Tensile | psi | — | 1934 | 1710 | 2197 | 1920 | 2441 |
| Elongation | % | — | 320 | 326 | 421 | 318 | 425 |
| Mod 10 | psi | — | 93 | 91 | 83 | 93 | 92 |
| Mod 25 | psi | — | 160 | 148 | 141 | 157 | 151 |
| Mod 50 | psi | — | 239 | 215 | 207 | 233 | 220 |
| Mod 100 | psi | — | 408 | 353 | 331 | 402 | 357 |
| Mod 200 | psi | — | 991 | 838 | 736 | 973 | 823 |
| Mod 300 | psi | — | 1796 | 1538 | 1327 | 1741 | 1481 |
| M25 ratio (With:Against) | (unitless) | 0.97 | 1.11 | 1.32 | 1.28 | 1.36 | 2.04 |
| Die C Tear | lb/in | 221 | 243 | 238 | 239 | 230 | 236 |
| DIN Abrasion | mm3 | 43 | 53 | 54 | 52 | 56 | 51 |

Table 8 shows the results of rheometer and Mooney scorch testing of the samples from Table 6.

TABLE 8

| | Unit | CE-4 | EX-4 | EX-5 | EX-6 | EX-7 | EX-8 |
|---|---|---|---|---|---|---|---|
| Rheometer @ 150 C. | | | | | | | |
| Min | (dNm) | — | 2.91 | 2.64 | 2.69 | 3.15 | 3.15 |
| Max | (dNm) | — | 31.43 | 30.13 | 26.48 | 31.63 | 28.4 |
| Tris1 | (min) | — | 5.59 | 5.24 | 6.27 | 5.05 | 5.48 |
| T25 | (min) | — | 8.72 | 8.8 | 10.29 | 8.17 | 9.23 |
| S25 | (dNm) | — | 10.04 | 9.51 | 8.64 | 10.27 | 9.46 |
| T90 | (min) | — | 13.34 | 13.52 | 15.49 | 12.32 | 140.62 |
| S90 | (dNm) | — | 28.58 | 27.38 | 24.1 | 28.78 | 25.87 |

TABLE 8-continued

| | Unit | CE-4 | EX-4 | EX-5 | EX-6 | EX-7 | EX-8 |
|---|---|---|---|---|---|---|---|
| Rate | (dNm/min) | — | 8.53 | 8.58 | 7.51 | 8.87 | 7.86 |
| Amount | (dNm) | — | 28.52 | 27.49 | 23.79 | 28.48 | 25.25 |
| Mooney Scorch @ 121 C. | | | | | | | |
| Initial | (dNm) | — | 33.85 | 30.92 | 28.94 | 34.02 | 35.02 |
| ML | (dNm) | — | 22.07 | 21.07 | 20.24 | 24 | 24.12 |

Tables 9 and 10 show the results of rolling resistance testing of the samples from Table 6. This data corresponds to the graphical illustrations shown in FIGS. 7-9.

TABLE 9

| | Unit | CE-4 | EX-4 | EX-5 | EX-6 | EX-7 | EX-8 |
|---|---|---|---|---|---|---|---|
| ARES @ 40 C., 2% Strain, 10 Hz | | | | | | | |
| G' | (MPa) | 4.26 | 4.04 | 3.60 | 4.28 | 4.97 | 4.42 |
| Tan Delta | (unitless) | 0.075 | 0.063 | 0.055 | 0.057 | 0.063 | 0.073 |
| RRF | $(1/(Mpa)^{\wedge}\frac{1}{3})$ | 0.032 | 0.027 | 0.025 | 0.024 | 0.025 | 0.031 |
| RRF Index | (%) | 100.00 | 84.97 | 77.10 | 75.78 | 78.88 | 95.72 |
| ARES @ 25 C., 2% Strain, 10 Hz | | | | | | | |
| G' | (MPa) | 4.50 | 4.16 | 3.72 | 4.39 | 5.18 | 4.62 |
| Tan Delta | (unitless) | 0.092 | 0.076 | 0.071 | 0.069 | 0.075 | 0.087 |
| RRF | $(1/(Mpa)^{\wedge}\frac{1}{3})$ | 0.039 | 0.033 | 0.032 | 0.029 | 0.030 | 0.036 |
| RRF Index | (%) | 100.00 | 85.25 | 82.77 | 75.73 | 77.65 | 93.51 |
| ARES @ 20 C., 2% Strain, 10 Hz | | | | | | | |
| G' | (MPa) | 4.57 | 4.20 | 3.77 | 4.42 | 5.25 | 4.68 |
| Tan Delta | (unitless) | 0.097 | 0.081 | 0.076 | 0.073 | 0.079 | 0.091 |
| RRF | $(1/(Mpa)^{\wedge}\frac{1}{3})$ | 0.040 | 0.035 | 0.034 | 0.031 | 0.032 | 0.038 |
| RRF Index | (%) | 100.00 | 86.15 | 83.58 | 76.59 | 78.36 | 94.04 |

TABLE 10

| | Unit | CE-4 | EX-4 | EX-5 | EX-6 | EX-7 | EX-8 |
|---|---|---|---|---|---|---|---|
| ARES @ 0 C., 2% Strain, 10 Hz | | | | | | | |
| G' | (MPa) | 4.93 | 4.49 | 4.00 | 4.58 | 5.52 | 4.98 |
| Tan Delta | (unitless) | 0.012 | 0.103 | 0.099 | 0.091 | 0.100 | 0.111 |
| RRF | $(1/(Mpa)^{\wedge}\frac{1}{3})$ | 0.050 | 0.043 | 0.043 | 0.038 | 0.039 | 0.045 |
| RRF Index | (%) | 100.00 | 86.81 | 86.84 | 76.69 | 79.03 | 90.85 |
| ARES @ −20 C., 2% Strain, 10 Hz | | | | | | | |
| G' | (MPa) | 5.75 | 5.08 | 4.53 | 5.15 | 6.18 | 5.76 |
| Tan Delta | (unitless) | 0.190 | 0.168 | 0.169 | 0.153 | 0.165 | 0.178 |
| RRF | $(1/(Mpa)^{\wedge}\frac{1}{3})$ | 0.073 | 0.068 | 0.071 | 0.061 | 0.062 | 0.069 |
| RRF Index | (%) | 100.00 | 92.48 | 96.61 | 83.56 | 85.16 | 94.03 |
| ARES @ −40 C., 2% Strain, 10 Hz | | | | | | | |
| G' | (MPa) | 15.20 | 18.28 | 20.22 | 30.04 | 21.95 | 34.18 |
| Tan Delta | (unitless) | 0.518 | 0.450 | 0.464 | 0.336 | 0.440 | 0.378 |
| RRF | $(1/(Mpa)^{\wedge}\frac{1}{3})$ | 0.145 | 0.118 | 0.118 | 0.075 | 0.109 | 0.081 |
| RRF Index | (%) | 100.00 | 81.65 | 81.44 | 51.66 | 75.01 | 55.65 |

As shown in the test results for the samples in Table 6, the introduction of smaller amounts of the high aspect ratio nanofiber were shown to still significantly improve rolling resistance without the negative affect on tensile strength or other mechanical properties such as modulus at 25% or abrasion resistance.

Figure 6:
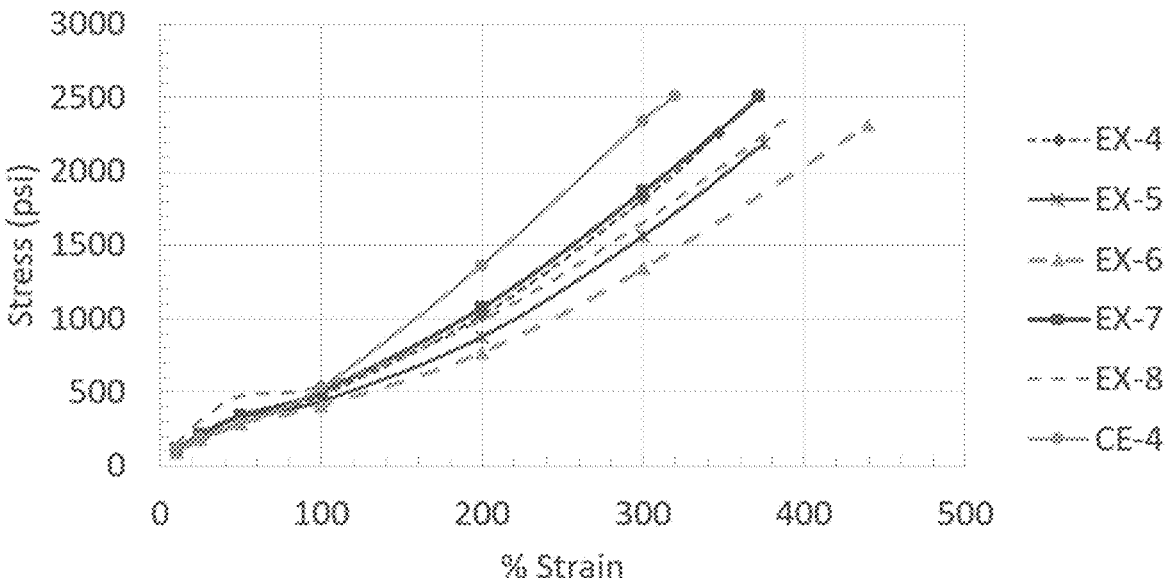
FIG. 6 illustrates stress v. strain data according to examples.
Figure 7:
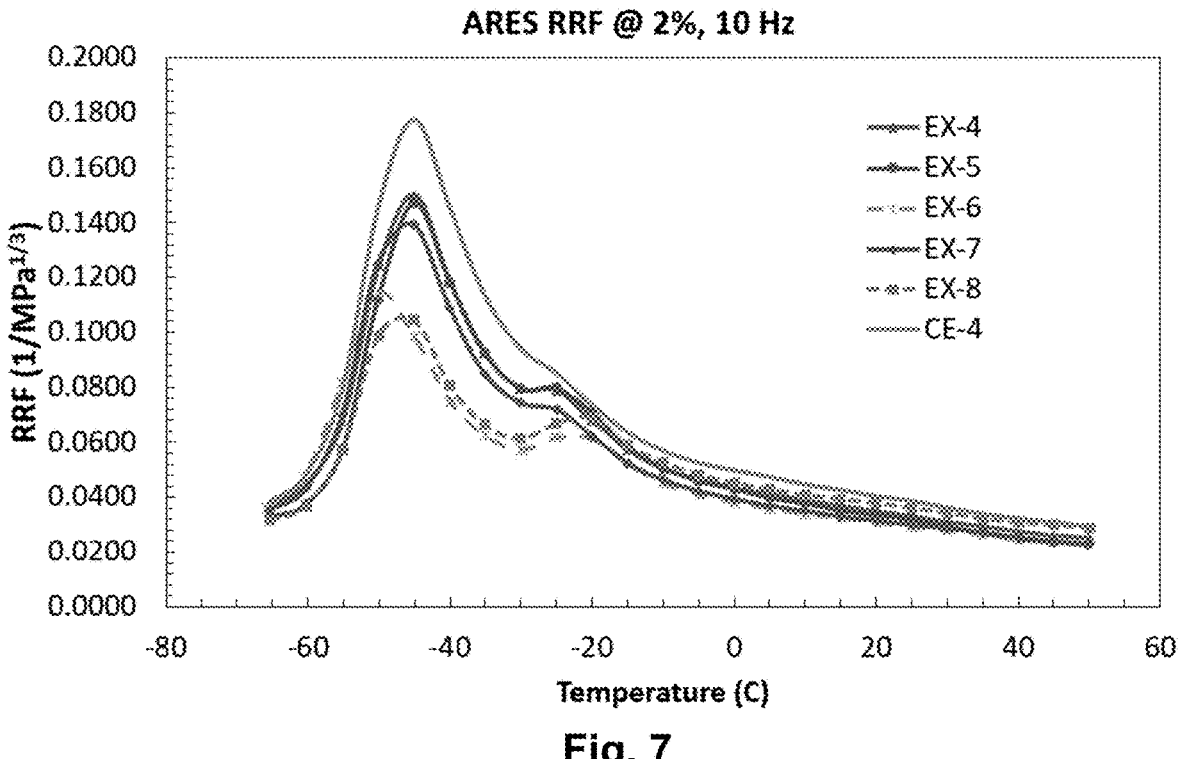
FIG. 7 illustrates rolling resistance factor data according to examples.
Figure 8:
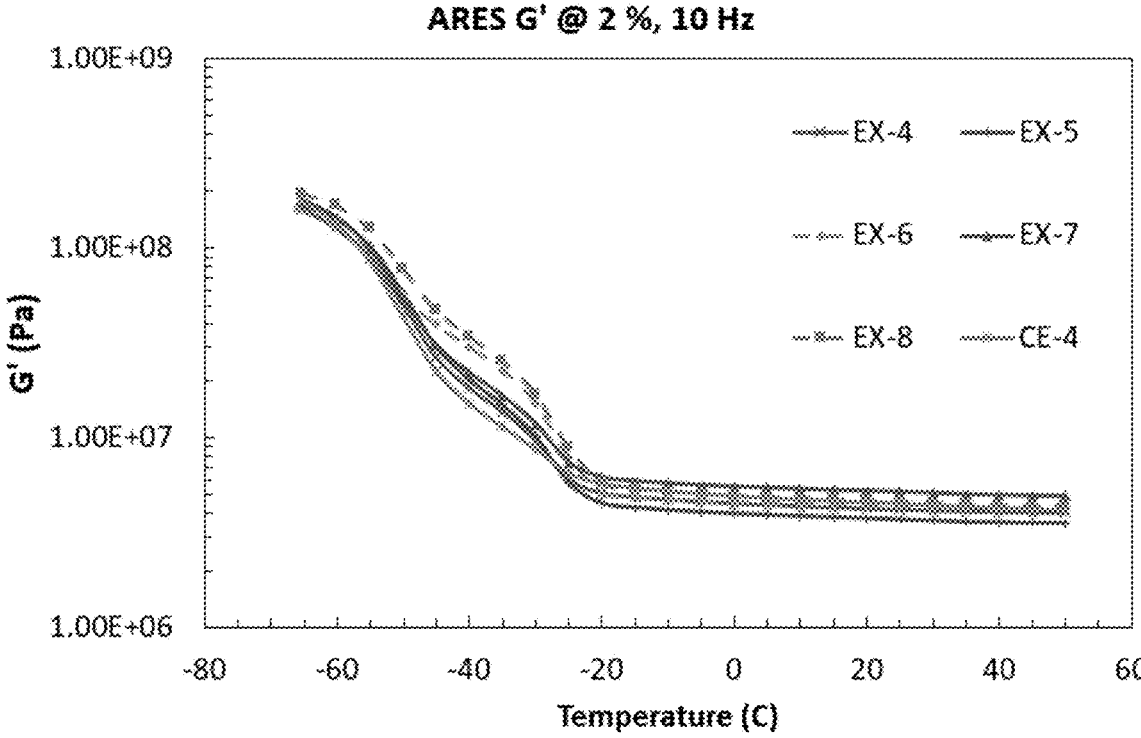
FIG. 8 illustrates storage modulus data according to examples.
Figure 9:
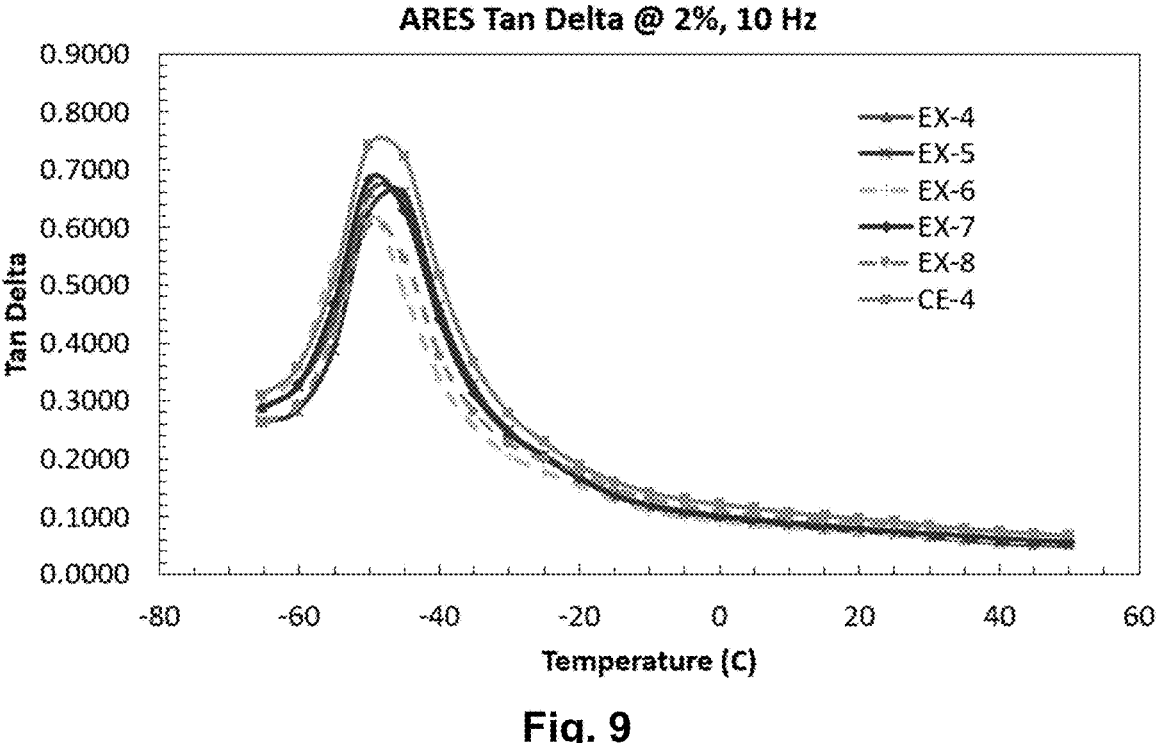
FIG. 9 illustrates tan delta data according to examples.
Figure 10:
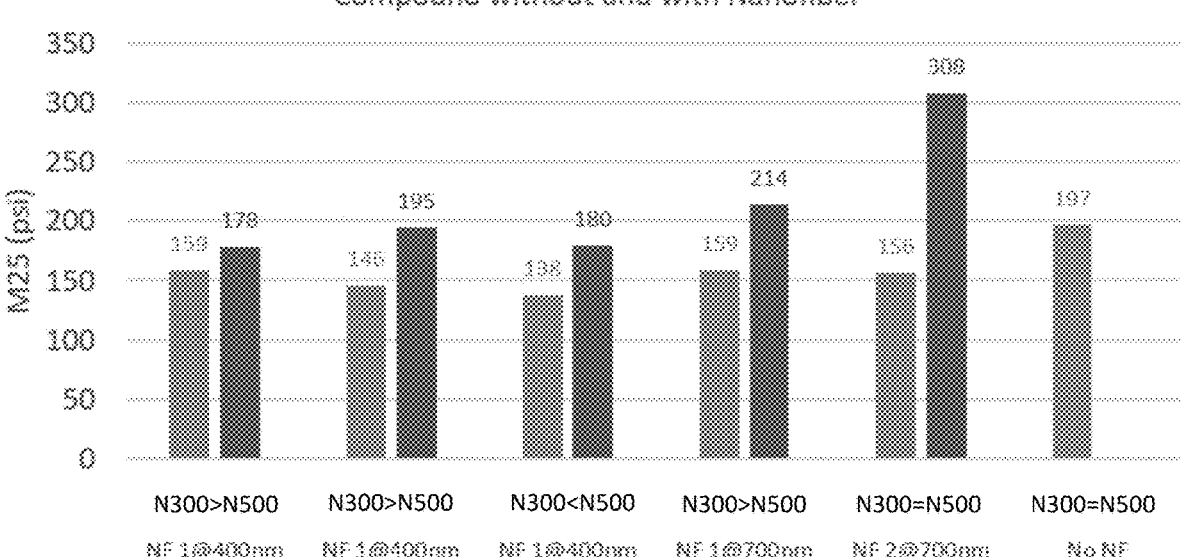
FIG. 10 illustrates Mod25 data according to examples.
Figure 11:
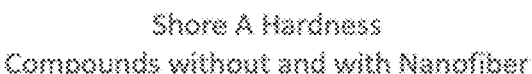
FIG. 11 illustrates Shore A hardness data according to examples.
Figure 11:
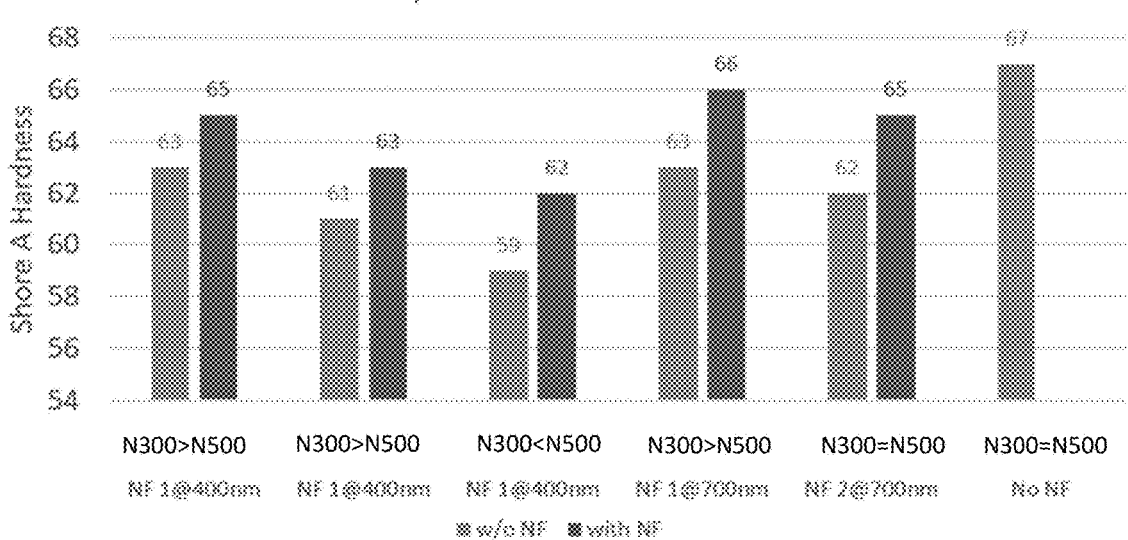
Figure 12:
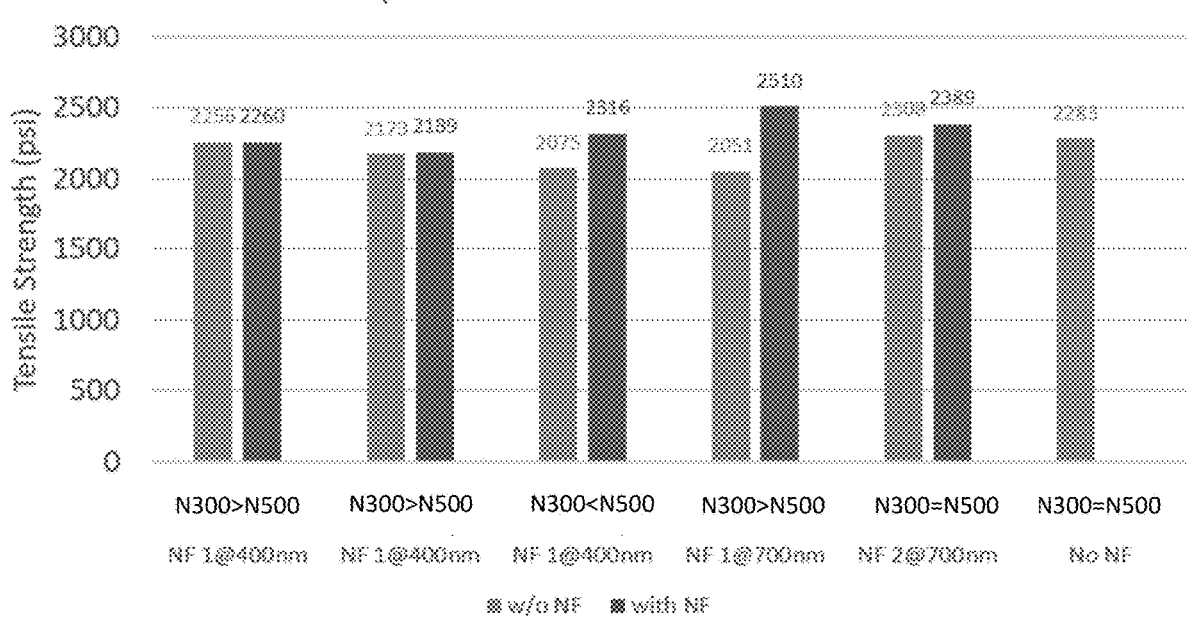
FIG. 12 illustrates tensile strength data according to examples.
Figure 13:
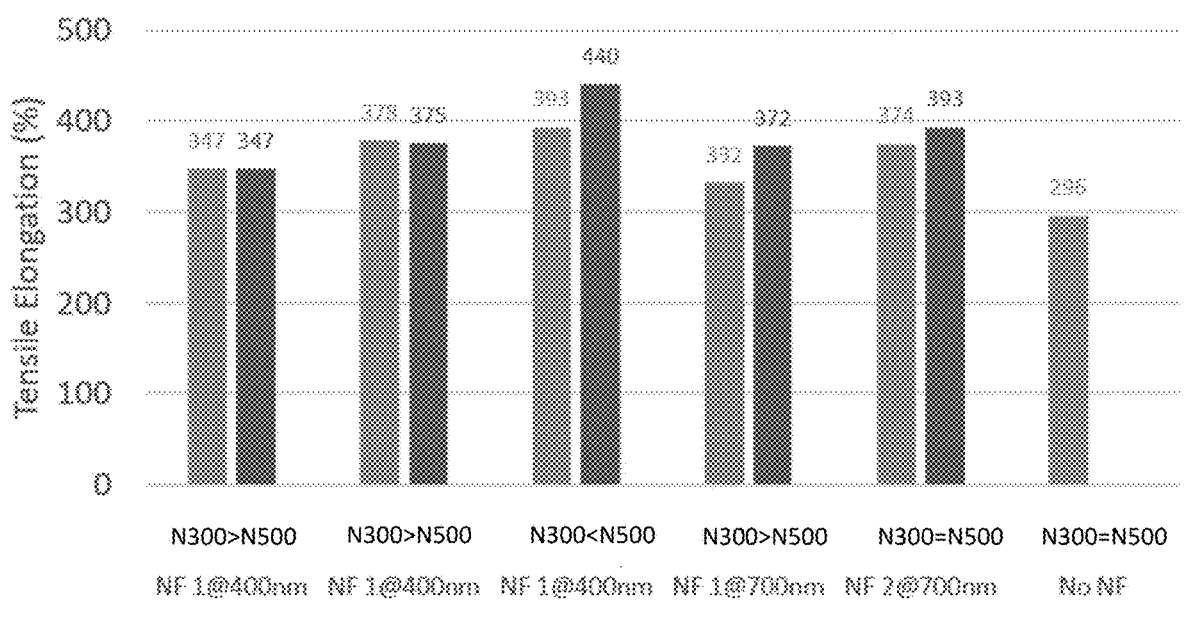
FIG. 13 illustrates elongation data according to examples.

For example, as shown in FIG. 6, the examples with nanofiber have a very similar or better tensile at 25% strain (Mod25) as compared to the control sample CE-4, which this modulus at low strain is the regime of interest for application such as conveyor belt. So, with the reduction in total carbon black amount according to these examples, along with the inclusion of about 1 or 2 phr nanofiber, the data confirms that there is little to no reduction in modulus at 25%, yet such samples still exhibit a significantly improved reduction in rolling resistance over a relevant temperature range as shown in FIGS. 7-9. In addition, the data in Table 7 confirms that overall tensile strength and/or abrasion resistance had little to no reduction, or in some cases an improvement, when compared to the comparative control sample CE-4.

FIGS. 10-13 show results that include additional testing to illustrate the effect of 1 or 2 phr of the high aspect ratio nanofiber with varying amounts of larger (N500-series) or finer (N300-series) carbon black. The bars on the left illustrate results of composition(s) tested without nanofiber and the bars on the right illustrate results with nanofiber (NF) (the descriptions 1 NF @ 400 nm meaning 1 phr of 400 nm×1 mm nanofiber, 2 NF @ 700 nm meaning 2 phr of 700 nm×1 mm nanofiber, etc.). The nanofibers tested are the same described in relation to Table 1, above, and include 400 nm diameter and 700 nm diameter high aspect ratio nanofibers. These results confirm that when the nanofibers are introduced at relatively low loading of 1 phr or 2 phr, and while maintaining a low overall loading of carbon black of 40 phr or less (e.g., 35-40 phr), the nanofibers do not hinder mechanical performance significantly, and in some cases improve mechanical performance. Again, this is while the lower overall loading of reinforcing agent (carbon black) improves the average rolling resistance factor over a relevant temperature range. The data also hints that the larger diameter nanofiber (700 nm) may perform better in some cases than the smaller diameter nanofiber (400 nm), which may be due to improved dispersion of the fibers. The large increase in 1 phr to 2 phr of the 700 nm high aspect ratio nanofiber in terms of Mod25 (FIG. 10) illustrates that this material is a highly-effective reinforcing agent.

FIGS. 14-16 illustrate regression data associated with test samples that introduced the high aspect ratio nanofibers. This data was compiled to further investigate the increase in mechanical properties at low amounts of the nanofibers, yet the deterioration of mechanical properties when the amount of nanofiber was incorporated beyond a certain amount. As shown in the regression trends, both the 400 nm diameter high aspect ratio nanofiber and the 700 nm diameter high aspect ratio nanofiber have high negative coefficients for tensile and elongation, indicating that the greater the amount of nanofiber incorporated into the composition, the more these properties are predicted to deteriorate. The results also show a positive coefficient for modulus at 25%, indicating the greater amount of nanofiber strongly increases Mod25. As shown, the 400 nm diameter nanofiber has a larger negative coefficient, indicating that this nanofiber compared to the 700 nm nanofiber may have more of a negative consequence on mechanical properties when added beyond a certain amount. Interestingly, the tensile strength coefficients for the carbon black being relatively highly positive suggests a counterbalance with the nanofiber content, which this, in turn, is counterbalanced against the rolling resistance factor results.

To further check this effect of the negative coefficients caused by the nanofibers, samples were tested having a simplified formulation based on EPDM elastomer, as shown in Table 11, in which the amount of high aspect ratio nanofiber is increased from Example A to Example C. This simplified EPDM compound is for illustration of the effect of nanofiber loading only, and is significantly different from the above-described elastomeric compound, and thus not necessarily suitable for use in a conveyor belt. The test results confirm that increasing the nanofiber content from 3 phr to 10 phr decreases tensile strength and elongation, and increases modulus at 25%. However, for some compositions and applications, it is believed that up to 10 phr of nanofibers could be included in the composition and still attain suitable properties as may be desired for such application.

TABLE 11

| Ingredients | Units | Ex. A | Ex. B | Ex. C |
|---|---|---|---|---|
| Elastomer: EPDM | phr | 100 | 100 | 100 |
| Nanofiber: 400 nm *1 mm | phr | 6 (3) | 12 (6) | 20 (10) |
| Carbon Black: N762 | phr | 45 | 45 | 45 |
| Plasticizer oil | phr | 10 | 10 | 10 |

TABLE 11-continued

| Ingredients | Units | Ex. A | Ex. B | Ex. C |
|---|---|---|---|---|
| Antidegradants | phr | 2 | 2 | 2 |
| Accelerator | phr | 0.53 | 0.53 | 0.53 |
| Coagent | phr | 31 | 31 | 31 |
| Organic Peroxide | phr | 4.4 | 4.4 | 4.4 |
| PHR Running Total: | phr | 198.93 | 204.93 | 212.93 |
| Orig. Mechanicals (With Fiber) | | | | |
| Tensile | psi | 2715 | 2296 | 2111 |
| Elongation | % | 178 | 144 | 89 |
| Mod 10 | psi | 381 | 589 | 733 |
| Mod 25 | psi | 616 | 961 | 1275 |
| Mod 50 | psi | 947 | 1422 | 1765 |
| Mod 100 | psi | 1597 | 1934 | |
| Hardness | Sh. A | 87 | 89 | 92 |
| Orig. Mechanicals (Against Fiber) | | | | |
| Tensile | psi | 2587 | 2384 | 1725 |
| Elongation | % | 175 | 135 | 83 |
| Mod 10 | psi | 377 | 517 | 575 |
| Mod 25 | psi | 587 | 822 | 887 |
| Mod 50 | psi | 900 | 1208 | 1315 |
| Mod 100 | psi | 1574 | 1899 | 1852 |
| Hardness | Sh. A | 86 | 89 | 93 |

Exemplary article(s) and/or elastomeric composition(s) have been described herein, more particularly in which the article may be a conveyor belt or cover layer of a conveyor belt including an elastomeric composition containing high-aspect ratio nanofibers that enable a reduction in the total amount of all reinforcing agent(s) in the composition while providing suitable mechanical properties, which, in turn, reduces average rolling resistance of the elastomeric composition.

According to an aspect, a conveyor belt includes: a top cover layer, a bottom cover layer, and a reinforcement layer between the top and bottom cover layers, wherein at least the bottom cover layer is formed from an elastomeric composition containing high aspect ratio nanofibers having a diameter in a range from 10 nm to 1,000 nm, and an aspect ratio in a range from 500 to 15,000.

Exemplary embodiment(s) may include one or more of the following additional features combined with any of the foregoing or following aspects, in which one or more of these additional features may be combined separately or in any suitable combination with each other.

In exemplary embodiment(s), the high aspect ratio nanofibers serve as an effective reinforcement agent that reduces overall reinforcing agent content as compared against another composition having a same composition as the elastomeric composition but without the high aspect ratio nanofibers, and reduces average rolling resistance factor of the elastomeric composition relative to the other composition over a temperature range from at least −20° C. to at least +20° C., as measured according to ARES testing, while having an original tensile strength and/or DIN abrasion resistance of not less than the other composition, or not less than 10% of the other composition, as measured according to ASTM D412 for tensile strength and/or ASTM D5963 for DIN abrasion resistance.

In exemplary embodiment(s), the high aspect ratio nanofibers reduce overall reinforcing agent content as compared against the other composition by at least 15%, more particularly in a range from 15% to 30%.

In exemplary embodiment(s), the high aspect ratio nanofibers reduce average rolling resistance factor of the elastomeric composition relative to the other composition over a temperature range from −40° C. to +40° C., as measured according to ARES testing.

In exemplary embodiment(s), the high aspect ratio nanofibers r average rolling resistance factor of the elastomeric composition relative to the other composition by at least 20%, more particularly from 15% to 25%.

In exemplary embodiment(s), the high aspect ratio nanofibers are present in the elastomeric composition in a total amount from 1 phr to 10 phr.

In exemplary embodiment(s), the high aspect ratio nanofibers are present in the elastomeric composition in a total amount from 1 phr to 5 phr.

In exemplary embodiment(s), the high aspect ratio nanofibers are present in the elastomeric composition in a total amount from 1 phr to 3 phr.

In exemplary embodiment(s), the high aspect ratio nanofibers serve as a first reinforcing agent of the elastomeric composition, the elastomeric composition further comprising one or more additional reinforcing agent(s); wherein a total amount of all reinforcing agents in the composition, including the high aspect ratio nanofibers and the one or more additional reinforcing agent(s), is present in a range from 30 phr to 60 phr.

In exemplary embodiment(s), a total amount of all reinforcing agents in the composition, including the high aspect ratio nanofibers and the one or more additional reinforcing agent(s), is present in a range 30 phr to 50 phr.

In exemplary embodiment(s), a total amount of all of the one or more additional reinforcing agent(s) in the composition is present in the elastomeric composition in a range from 30 phr to 45 phr.

In exemplary embodiment(s), a total amount of all of the one or more additional reinforcing agent(s) in the composition is present in the elastomeric composition in a range from 35 phr to 45 phr.

In exemplary embodiment(s), the one or more additional reinforcing agent(s) is one or more type(s) of carbon black having an $N_2$ surface area from 40 m²/g to 99 m²/g according to ASTM D3037.

In exemplary embodiment(s), the reinforcing agents in the elastomeric composition consist of one or more types of high aspect ratio nanofibers and one or more types of carbon blacks.

In exemplary embodiment(s), the elastomeric composition comprises at least two base elastomers including (i) one or more polybutadiene elastomers and (ii) one or more natural rubber(s) and/or one or more polyisoprene elastomer(s), wherein the two or more base elastomers constitute at least 90% by weight of the base elastomers of the elastomeric composition.

In exemplary embodiment(s), the high aspect ratio nanofibers have a length in a range from 0.25 mm to 5 mm.

In exemplary embodiment(s), the high aspect ratio nanofibers have a length in a range from 0.5 mm to 3 mm.

In exemplary embodiment(s), the high aspect ratio nanofibers have a length in a range from 0.5 mm to 1.5 mm.

In exemplary embodiment(s), the high aspect ratio nanofibers have a diameter in a range from 100 nm to 1,000 nm.

In exemplary embodiment(s), the high aspect ratio nanofibers have a diameter in a range from 400 nm to 700 nm.

In exemplary embodiment(s), the high aspect ratio nanofibers have an aspect ratio in a range from 500 to 5,000.

In exemplary embodiment(s), the high aspect ratio nanofibers have an aspect ratio in a range from 1,000 to 2,500.

In exemplary embodiment(s), the high aspect ratio nanofibers have an aspect ratio in a range from 1,000 to 2,000.

In exemplary embodiment(s), the high aspect ratio nanofibers have an aspect ratio in a range from 1,200 to 1,500.

In exemplary embodiment(s), the high aspect ratio nanofibers are derived from conjugate fibers dispersed in the elastomeric composition.

In exemplary embodiment(s), the conjugate fibers have a sea-island fiber morphology in which, for each conjugate fiber, the nanofibers form islands within a sea of polymeric material.

In exemplary embodiment(s), a mass ratio of the fibers forming the islands to the polymeric material forming the sea to is in a range from 60:40 to 95:5.

In exemplary embodiment(s), a mass ratio of the fibers forming the islands to the polymeric material forming the sea to is in a range from 60:40 to 75:25.

In exemplary embodiment(s), a mass ratio of the fibers forming the islands to the polymeric material forming the sea to is in a range from 50:50 to 70:30.

In exemplary embodiment(s), the high aspect ratio nanofibers are formed from one or more of polyethylene terephthalate (PET), polyamide (nylon 6, nylon 6,6), and naturally-derived (e.g., cellulose-based) material.

In exemplary embodiment(s), the polymeric material forming the sea is thermoplastic polymer.

In exemplary embodiment(s), the polymeric material forming the sea is polyethylene, ethylene-vinyl acetate copolymer, or polyamide.

In exemplary embodiment(s), a ratio of modulus at 25% measured parallel to an orientation of the nanofibers (modulus at 25% with fiber) relative to modulus at 25% measured perpendicular to an orientation of the nanofibers (modulus at 25% against fiber), as measured according to ASTM D412, is in a range from 1.0 to 2.0.

In exemplary embodiment(s), a ratio of modulus at 25% measured parallel to an orientation of the nanofibers (modulus at 25% with fiber) relative to modulus at 25% measured perpendicular to an orientation of the nanofibers (modulus at 25% against fiber), as measured according to ASTM D412, is in a range from 1.0 to 1.5.

In exemplary embodiment(s), the composition is devoid of silica.

In exemplary embodiment(s), the composition is devoid of dispersed reinforcing fibers having a diameter of greater than 1 mm.

In exemplary embodiment(s), the elastomeric composition is formed only on the bottom cover layer of the conveyor belt, the top cover layer being formed of a different elastomeric composition.

According to another aspect, an article includes an elastomeric body formed from an elastomeric composition including: two or more base elastomers including at least (i) one or more polybutadiene elastomers and (ii) one or more natural rubber(s) and/or one or more polyisoprene elastomer(s), wherein the two or more base elastomers altogether constitute at least 90 phr of the base elastomers of the elastomeric composition; one or more types of high aspect ratio nanofibers serving as a first reinforcing agent of the elastomeric composition, the one or more types of high aspect ratio nanofibers having a diameter in a range from 100 nm to less than 1,000 nm and an aspect ratio in a range from 500 to 2,500, the one or more types of high aspect ratio nanofibers being present in the elastomeric composition in a range from 1 phr to 5 phr; wherein the high aspect ratio nanofibers are derived from conjugate fibers dispersed in the elastomeric composition, the conjugate fibers having a sea-island fiber morphology in which, for each conjugate fiber, the nanofibers form islands within a sea of thermoplastic polymeric material, and wherein a mass ratio of the fibers forming the islands to the thermoplastic polymeric material forming the sea is in a range from 60:40 to 75:25; and one or more additional reinforcing agent(s), wherein a total amount of all reinforcing agents in the composition, including the high aspect ratio nanofibers and the one or more additional reinforcing agent(s), is present in a range from 30 phr to 50 phr.

In exemplary embodiment(s), a ratio of modulus at 25% measured parallel to an orientation of the nanofibers relative to modulus at 25% measured perpendicular to an orientation of the nanofibers, as measured according to ASTM D412, is in a range from 1.0 to 2.0.

In exemplary embodiment(s), the elastomeric composition of the article is devoid of silica, devoid of any other type of fiber except the one or more types of high aspect ratio nanofibers, and/or is devoid of any plasticizer oil.

In exemplary embodiment(s), the one or more additional reinforcing agent(s) in the article elastomeric composition consists of one or more types of carbon black(s).

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. Thus, while a particular feature may have been described with respect to only one or more of several embodiments, such feature may be combined with one or more other features of the other embodiments, separately or in any combination. The same may also be varied in many ways. Such variations are not to be regarded as a departure from the disclosure, and all such modifications are intended to be included within the scope of the disclosure. as may be desired and advantageous for any given or particular application.

Any background information contained in this disclosure is to facilitate a better understanding of the various aspects described herein. It should be understood that any such background statements are to be read in this light, and not as admissions of prior art. Likewise, the description and examples are presented herein solely for the purpose of illustrating the various embodiments of the disclosure and should not be construed as a limitation to the scope and applicability of the disclosure.

The phrase "and/or" as used in this disclosure should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer to, in one embodiment, to A without B (optionally including elements other than B); in another embodiment, to B without A (optionally including elements other than A); in yet another embodiment, to both A and B (optionally including other elements); etc.

The word "or" as used in this disclosure should be understood as being inclusive and not exclusive. For example, when separating items in a list, "or" or "and/or" shall be interpreted as being inclusive, i.e., the inclusion of at least one, but also including more than one, of a number or list of elements, and, optionally, additional unlisted items. For example, a condition A or B is satisfied by anyone of the following: A is true (or present) and B is false (or not present), A is false (or not present) and B is true (or present), and both A and B are true (or present). Only terms clearly indicating exclusivity should be interpreted as indicating exclusive alternatives (i.e. "one or the other but not both"), such as "either," "only one of," or "exactly one of." In other words, such terms of exclusivity refer to the inclusion of exactly one element of a number or list of elements.

Any references to "one embodiment" or "an embodiment" as used herein is understood to mean that a particular element, feature, structure, or characteristic described in connection with the embodiment is included in at least one embodiment. The appearances of the phrase "in one embodiment" in various places in the specification are not necessarily referring to the same embodiment.

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The word "exemplary" is used herein to mean "serving as an example or illustration." Any aspect or design described herein as "exemplary" is not necessarily to be construed as preferred or advantageous over other aspects or designs. Likewise, the phrases "particularly," "preferably," or the like as used in this disclosure may refer to an element or value that provides advantage(s) in some embodiment(s), however is not intended to limit the scope of the disclosure to those "particular" or "preferable" features.

Transitional language such as "including," "comprising," "having," "containing," "involving," or variations thereof, is intended to be broad and encompass the subject matter listed thereafter, equivalents, and additional subject matter not recited, i.e., to be open-ended and meaning including but not limited to.

It is to be understood that terms such as "top," "bottom," "left," "right," "front," "rear," or the like may refer to an arbitrary frame of reference, rather than to the ordinary gravitational frame of reference. Likewise, spatially relative terms, such as "inner", "adjacent", "outer," "beneath," "below," "lower," "above," "upper," or the like, may be used herein for ease of description to describe one element or feature's relationship to another element(s) or feature(s) as illustrated in the figures. Spatially relative terms may be intended to encompass different orientations of the article in use or operation in addition to the orientation depicted in the figures. For example, if the article in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Terms such as first, second, third, etc. may be used herein to describe various elements, components, regions, layers and/or sections, in which it is understood that these elements, components, regions, layers and/or sections should not be limited by these terms unless stated otherwise. In addition, terms such as "first," "second," and other numerical terms when used herein do not imply a sequence or order unless clearly indicated by the context. Thus, a first element, component, region, layer or section discussed herein could be termed a second element, component, region, layer or section without departing from the teachings of this disclosure.

It is to be understood that all values, ranges, ratios or the like as described in this disclosure may be combined in any manner. In addition, it is to be understood that a concentration or amount or value range listed in this disclosure is intended to include any and every concentration or amount or value within the range, including the end points, as if each value within the range has been expressly stated. For example, "a range of from 1 to 10" is to be read as indicating each and every possible number along the continuum between about 1 and about 10. Thus, even if specific data points within the range, or even no data points within the range, are explicitly identified or refer to only a few specific data points, it is to be understood that the inventor(s) appreciate and understand that any and all data points within the range are to be considered to have been specified, and that inventor(s) had possession of the entire range and all points within the range.

In addition, each numerical value used in this disclosure should be read once as modified by the term "about" (unless already expressly so modified), and then read again as not so modified unless otherwise indicated in context. The term "about" as used herein refers to any value which lies within the range defined by a variation of up to ±10% of the stated value, for example, 10%, 9%, 8%, 7%, +6%, 5%, 4%, 3%, 2%, 1%, 0.01%, or 0.0% of the stated value, as well as values intervening such stated values. When the term "about" is used in describing a value or an end-point of a range, the disclosure should be understood to include the specific value or end-point referred to.

The term "consisting essentially of" in relation to a composition is to indicate that substantially (e.g., greater than 95 weight % or greater than 99 weight %) of the component(s) present in the composition is the component(s) recited. Therefore, this term does not exclude the presence of minor additives or impurities as would be understood by those having ordinary skill in the art.

Although the invention has been shown and described with respect to a certain embodiment or embodiments, it is apparent that equivalent alterations and modifications will occur to those having ordinary skill in the art upon the reading and understanding this disclosure, and such modifications are intended to be included within the scope of this disclosure as defined in the claims. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure.

LIST OF REFERENCE NUMERALS (PART OF THE SPECIFICATION)

100, 200 Conveyor belt
102 Top cover layer

104 Bottom cover layer
106, 206 Reinforcement layer
108 Reinforcing cords
110 Elastomeric body
208 Textile reinforcement
212 Skim layer
214 Skim layer

What is claimed is:

1. A conveyor belt comprising:
a top cover layer,
a bottom cover layer, and
a reinforcement layer between the top and bottom cover layers,
wherein at least the bottom cover layer is formed from an elastomeric composition containing high aspect ratio nanofibers having a diameter in a range from 10 nm to 1,000 nm, and an aspect ratio in a range from 500 to 15,000.

2. The conveyor belt according to claim 1, wherein the high aspect ratio nanofibers are present in the elastomeric composition in a total amount from 1 phr to 10 phr.

3. The conveyor belt according to claim 1, wherein the high aspect ratio nanofibers are present in the elastomeric composition in a total amount from 1 phr to 5 phr.

4. The conveyor belt according to claim 1, wherein the high aspect ratio nanofibers serve as a first reinforcing agent of the elastomeric composition, the elastomeric composition further comprising one or more additional reinforcing agent(s); wherein a total amount of all reinforcing agents in the composition, including the high aspect ratio nanofibers and the one or more additional reinforcing agent(s), is present in a range from 30 phr to 60 phr.

5. The conveyor belt according to claim 4, wherein a total amount of all of the one or more additional reinforcing agent(s) in the composition is present in the elastomeric composition in a range from 30 phr to 45 phr.

6. The conveyor belt according to claim 1, wherein the one or more additional reinforcing agent(s) is one or more type(s) of carbon black having an $N_2$ surface area from 40 $m^2/g$ to 99 $m^2/g$ according to ASTM D3037.

7. The conveyor belt according to claim 1, wherein the elastomeric composition comprises at least two base elastomers including (i) one or more polybutadiene elastomers and (ii) one or more natural rubber(s) and/or one or more polyisoprene elastomer(s), wherein the two or more base elastomers constitute at least 90% by weight of the base elastomers of the elastomeric composition.

8. The conveyor belt according to claim 1, wherein the high aspect ratio nanofibers have a length in a range from 0.25 mm to 5 mm.

9. The conveyor belt according to claim 1, wherein the high aspect ratio nanofibers have a diameter in a range from 100 nm to 1,000 nm.

10. The conveyor belt according to claim 1, wherein the high aspect ratio nanofibers have an aspect ratio in a range from 500 to 2,500.

11. The conveyor belt according to claim 1, wherein the high aspect ratio nanofibers are derived from conjugate fibers dispersed in the elastomeric composition, the conjugate fibers having a sea-island fiber morphology in which, for each conjugate fiber, the nanofibers form islands within a sea of polymeric material.

12. The conveyor belt according to claim 11, wherein a mass ratio of the fibers forming the islands to the polymeric material forming the sea to is in a range from 60:40 to 95:5.

13. The conveyor belt according to claim 11, wherein the high aspect ratio nanofibers are formed from one or more of polyethylene terephthalate (PET), polyamide (nylon 6, nylon 6,6), and naturally-derived (e.g., cellulose-based) material.

14. The conveyor belt according to claim 11, wherein the polymeric material forming the sea is thermoplastic polymer selected from the group consisting of: polyethylene, ethylene-vinyl acetate copolymer, and polyamide.

15. The conveyor belt according to claim 1, wherein a ratio of modulus at 25% measured parallel to an orientation of the nanofibers (modulus at 25% with fiber) relative to modulus at 25% measured perpendicular to an orientation of the nanofibers (modulus at 25% against fiber), as measured according to ASTM D412, is in a range from 1.0 to 2.0.

16. The conveyor belt according to claim 1, wherein the composition is devoid of silica; and/or wherein the composition is devoid of dispersed reinforcing fibers having a diameter of greater than 1 mm.

17. The conveyor belt according to claim 1, wherein the elastomeric composition is formed only on the bottom cover layer of the conveyor belt, the top cover layer being formed of a different elastomeric composition.

18. An article comprising an elastomeric body formed from an elastomeric composition comprising:

two or more base elastomers including at least (i) one or more polybutadiene elastomers and (ii) one or more natural rubber(s) and/or one or more polyisoprene elastomer(s), wherein the two or more base elastomers altogether constitute at least 90 phr of the base elastomers of the elastomeric composition;

one or more types of high aspect ratio nanofibers serving as a first reinforcing agent of the elastomeric composition, the one or more types of high aspect ratio nanofibers having a diameter in a range from 100 nm to less than 1,000 nm and an aspect ratio in a range from 500 to 2,500, the one or more types of high aspect ratio nanofibers being present in the elastomeric composition in a range from 1 phr to 5 phr; wherein the high aspect ratio nanofibers are derived from conjugate fibers dispersed in the elastomeric composition, the conjugate fibers having a sea-island fiber morphology in which, for each conjugate fiber, the nanofibers form islands within a sea of thermoplastic polymeric material, and wherein a mass ratio of the fibers forming the islands to the thermoplastic polymeric material forming the sea is in a range from 60:40 to 75:25;

one or more additional reinforcing agent(s), wherein a total amount of all reinforcing agents in the composition, including the high aspect ratio nanofibers and the one or more additional reinforcing agent(s), is present in a range from 30 phr to 50 phr;

wherein a ratio of modulus at 25% measured parallel to an orientation of the nanofibers relative to modulus at 25% measured perpendicular to an orientation of the nanofibers, as measured according to ASTM D412, is in a range from 1.0 to 2.0.

19. The article according to claim 18, wherein the elastomeric composition is devoid of silica, devoid of any other type of fiber except the one or more types of high aspect ratio nanofibers, and is devoid of any plasticizer oil; and wherein the one or more additional reinforcing agent(s) consists of one or more types of carbon black(s).

* * * * *